(12) United States Patent
Knotts et al.

(10) Patent No.: US 12,063,938 B2
(45) Date of Patent: Aug. 20, 2024

(54) TRUSSING SYSTEM AND METHOD

(71) Applicant: Scott Technology Limited, Dunedin (NZ)

(72) Inventors: Peter Douglas Raymond Knotts, Christchurch (NZ); Bryan Gordon Grimshaw, Christchurch (NZ); Jamie Robert Spyker, Christchurch (NZ)

(73) Assignee: SCOTT TECHNOLOGY LIMITED, Dunedin (NZ)

( * ) Notice: Subject to any disclaimer, the term of this patent is extended or adjusted under 35 U.S.C. 154(b) by 1032 days.

(21) Appl. No.: 16/930,437

(22) Filed: Jul. 16, 2020

(65) Prior Publication Data

US 2021/0051967 A1 Feb. 25, 2021

(30) Foreign Application Priority Data

Aug. 23, 2019 (NZ) ....................................... 756672

(51) Int. Cl.
*A22C 21/00* (2006.01)
*A22C 17/00* (2006.01)
*B25J 9/00* (2006.01)
*B25J 9/16* (2006.01)

(52) U.S. Cl.
CPC ........ *A22C 21/0038* (2013.01); *A22C 17/008* (2013.01); *A22C 21/0053* (2013.01); *B25J 9/0093* (2013.01); *B25J 9/1682* (2013.01); *B25J 9/1697* (2013.01)

(58) Field of Classification Search
CPC . A22C 21/003; A22C 17/008; A22C 21/0053; B25J 9/0093; B25J 9/1682; B25J 9/1697

USPC ......................................................... 452/174
See application file for complete search history.

(56) References Cited

U.S. PATENT DOCUMENTS

| | | | |
|---|---|---|---|
| 5,816,905 A * | 10/1998 | Marchese | A22C 21/0038 452/176 |
| 7,476,148 B2 | 1/2009 | McQuillan et al. | |
| 7,591,719 B1 * | 9/2009 | Thompson | A22C 21/0038 452/174 |
| 10,212,951 B2 | 2/2019 | Ouellet et al. | |

FOREIGN PATENT DOCUMENTS

| | | |
|---|---|---|
| CA | 2 778 719 | 11/2013 |
| EP | 0413629 A1 † | 2/1991 |
| EP | 0 425 400 A1 | 5/1991 |
| EP | 0493852 A1 † | 7/1992 |
| EP | 2201844 A1 † | 6/2010 |
| EP | 2 201 844 B1 | 5/2015 |
| ES | 2144369 A1 † | 5/1998 |
| FR | 0 413 629 A1 | 2/1991 |
| FR | 2724294 B1 | 9/1994 |
| FR | 2902606 B1 | 6/2006 |
| GB | 2332615 A † | 6/1999 |
| WO | 2007148030 A2 † | 12/2007 |
| WO | 2011/047487 A4 | 4/2011 |

\* cited by examiner
† cited by third party

*Primary Examiner* — Richard T Price, Jr.
(74) *Attorney, Agent, or Firm* — Merchant & Gould P.C.

(57) ABSTRACT

An apparatus for trussing a slaughtered bird, is described the apparatus including: two or more members having trussing band retaining members, wherein the apparatus is configured to truss a slaughtered bird with a trussing band. Also described is a slaughtered bird holder, a method for trussing's a slaughtered bird, a vision system and a controller.

9 Claims, 35 Drawing Sheets

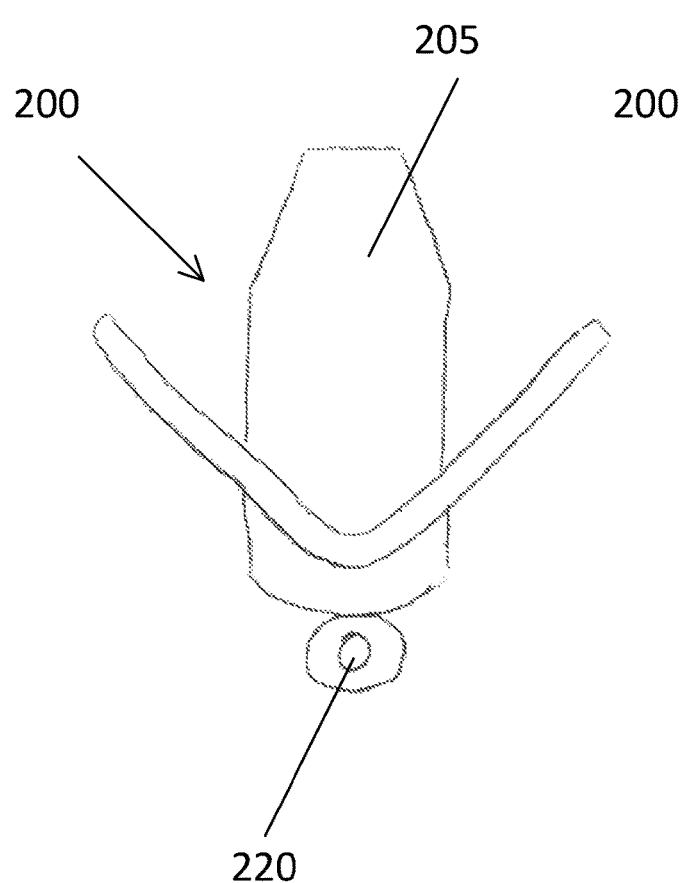
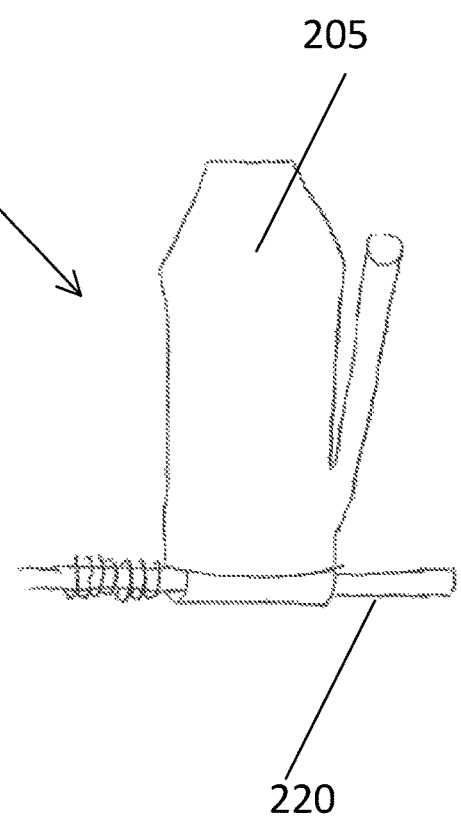
Figure 8
Figure 9

410

415  425
425
425

415
425  295
425  425

415  295
425

TRUSSING SYSTEM AND METHOD

This application claims benefit of Serial No. 756672, filed 23 Aug. 2019 in New Zealand and which application is incorporated herein by reference. To the extent appropriate, a claim of priority is made to the above disclosed application.

FIELD

This invention relates to a Trussing System and Method.

BACKGROUND

Poultry chickens and turkeys are typically trussed manually on a production line. This is labour intensive and workers regularly suffer from repetitive strain injury.

SUMMARY

According to one example embodiment there is provided a slaughtered bird holder configured to hold a slaughtered bird, the slaughtered bird holder including: a slaughtered bird support configured to support at least a part of a slaughtered bird, and a shaft configured to support a trussing band in a first state, wherein the slaughtered bird support and the shaft move relative to each other between the first state and a second state.

In examples, the shaft is attached to the slaughtered bird support.

In examples, moving the shaft from the first state to the second state when a trussing band is supported by the causes a trussing band to be released from the shaft.

In examples, the support includes twin beams aligned with a backbone of slaughtered bird.

In examples, further including hock supports.

In examples, further including wing supports.

In examples, the slaughtered bird holder is configured to be automatically loaded with a slaughtered bird.

Alternatively, the slaughtered bird holder is configured to be manually loaded with a slaughtered bird.

In examples, the slaughtered bird holder is configured to automatically unload a slaughtered bird.

In examples, the slaughtered bird holder is configured to be secured above a conveyor.

In examples, the conveyor is a conveyor track.

Alternatively, the slaughtered bird holder is configured to be secured below an overhead conveyor.

In examples, overhead conveyor is an overhead chain.

In examples, the slaughtered bird is a poultry bird.

In examples, the poultry bird is selected from the group comprising a chicken and a turkey.

According to another example embodiment there is provided an apparatus for joining trussing bands, the apparatus including: an adjustable jig, and a joining apparatus configured to join an adjustable length of a trussing band around the jig.

In examples, the adjustable jig is a mandrel having a finger.

In examples, the finger of the mandrel is adjustable.

In examples, adjusting the finger of the mandrel adjusts the length of the mandrel.

In examples, at least one jig is coupled to a conveyer.

In examples, the conveyer is indexed to a second apparatus for manipulating the trussing band.

In examples, a second apparatus is configured to truss a slaughtered bird with the trussing band.

In examples, the joining apparatus is configured to join the trussing band in a predetermined position with respect to the jig.

In examples, the join is a knot.

In examples, the adjustable length of the trussing band is determined by a size of a slaughtered bird to be trussed.

In examples, the slaughtered bird is a poultry bird.

In examples, the poultry bird is selected from the group comprising a chicken and a turkey.

According to yet another example embodiment there is provided an apparatus for trussing a slaughtered bird, the apparatus including: two or more members having trussing band retaining members, wherein the apparatus is configured to truss a slaughtered bird with a trussing band.

In examples, the apparatus is an end effector of a robot.

In examples, at least one of the trussing band retaining members is a hook.

In examples, at least one of the trussing band retaining members is an annular groove.

In examples, further including an actuator configured to actuate at least one of the two or more members.

In examples, further including an actuator allowing for movement/translation of the apparatus.

In examples, at least one of the two or more members is retractable

In examples, at least one of the two or more members is configured to rotate about a longitudinal axis In examples, the apparatus is configured to pick up a trussing band from a load station.

In examples, the load station is coupled to a conveyer.

In examples, at least one of the two or more members includes a load cell configured to determine the tension of a retained trussing band.

In examples, at least two of the two or more members for at least part of a length of the member have a first transverse axis larger than a second transverse axis at the same location on the member.

In examples, two of the at least two of the two or more members are configured to from a first position in which the first axis of a first of the two members is collinear to the first axis of a second of the two members to a second position in which the first axis of the two members is parallel and wherein in the second position in which a trussing band located on the length of the members having a first transverse axis larger than a second transverse axis at the same location spreads the trussing band.

In examples, the shape of the length of the members having a first transverse axis larger than a second transverse axis at the same location is selected from the group consisting of rectangular, oval and obround.

In examples, the slaughtered bird is a poultry bird.

In examples, the poultry bird is selected from the group comprising a chicken and a turkey.

According to a still further example embodiment there is provided a slaughtered bird trussing system, the slaughtered bird trussing system including: a vision system, the vision system including at least one image capture device for capturing at least one image of a slaughtered bird, and a determination system configured to determine a quality of a slaughtered bird based on the at least one image.

In examples, the determination system is further configured to determine a size of a slaughtered bird based on the at least one image.

In examples, the determination system is further configured to calculate the required length a trussing band based on at least the determined size.

In examples, further including a controller and a communication system.

In examples, the controller receives information on the type of truss.

In examples, the controller receives information on a weight of a slaughtered bird to be trussed.

In examples, wherein the controller receives information on a size of a slaughtered bird to be trussed.

In examples, the communication system communicates with a truss tying apparatus.

In examples, the communication system communicates with and controls a truss tying apparatus.

In examples, the truss tying apparatus includes: an adjustable jig, and a joining apparatus configured to join an adjustable length of a trussing band around the jig.

In examples, the communication system communicates with and controls a trussing apparatus for trussing a slaughtered bird.

In examples, the trussing apparatus is a robot.

In examples, the motion of the robot is controlled based on information from the vision system.

In examples, the robot holds a slaughtered bird and trusses the slaughtered bird by moving the slaughtered bird relative to a fixed trussing band.

In examples, a slaughtered bird is held, and wherein the robot trusses the slaughtered bird by moving a trussing band over the slaughtered bird.

In examples, the slaughtered bird is a poultry bird.

In examples, the poultry bird is selected from the group comprising a chicken and a turkey.

In examples, the determination system is further configured to determine a shape of a slaughtered bird.

In examples, the determination system is further configured to determine a position of a slaughtered bird.

In examples, the determination system is further configured to determine if a wing is in a correct position.

In examples, determining the quality of a slaughtered bird involves determining if a wing and/or leg of the slaughtered bird is broken.

In examples, determining the quality of a slaughtered bird further involves determining the skin condition of the slaughtered bird.

In examples, the determination system is further configured to determine a quality of a truss on a slaughtered bird.

In examples, determining the quality of a truss on a slaughtered bird including determining whether a trussing band is in a correct position.

In examples, the determination system is further configured to calculate the required length a trussing band based on at least a shape of a slaughtered bird.

In examples, the determination system is further configured to calculate the required length a trussing band based on at least a trussing method.

In examples, at least one of the at least one image capture devices generates a two-dimensional image of a slaughtered bird.

In examples, at least one of the at least one image capture devices generates a three-dimensional image of a slaughtered bird.

In examples, the image capture device to generate a three-dimensional image is a time-of-flight camera.

In examples, the image capture device to generate a two-dimensional image is selected from the group comprising a camera, a CCD and an image sensor.

According to another example embodiment there is provided a system for trussing slaughtered birds, the system including: a plurality of slaughtered bird holders, each slaughtered bird holder configured to hold a slaughtered bird; a conveyer configured to convey the plurality of slaughtered bird holders; and a trussing station including a trussing apparatus configured to truss a slaughtered bird with a trussing band.

In examples, the slaughtered bird holders are the slaughtered bird holders described above.

In examples, the trussing apparatus is the trussing described above.

In examples, further including a vision system configured to determine at least one of a size, a shape, a position, and a quality of a slaughtered bird.

In examples, the trussing apparatus includes a robot and the vision system is further configured to guide the robot path.

In examples, the vision system is further configured to determine whether a trussing band is in a correct position.

In examples, vision system is disposed upstream of the trussing station.

In examples, the vision system is disposed downstream of the trussing station.

In examples, further including a truss band joining system.

In examples, the trust band joining system includes: an adjustable jig, and a joining apparatus configured to join an adjustable length of a trussing band around the jig.

In examples, the slaughtered bird is a poultry bird.

In examples, the poultry bird is selected from the group comprising a chicken and a turkey.

According to yet another example embodiment there is provided a method trussing a slaughtered bird with a trussing band, the method including: positioning a slaughtered bird in a holder with the front of the slaughtered bird facing outwards; controlling a trussing apparatus to: pass the trussing band over a front of the slaughtered bird, pass the trussing band under a first and second wing of the slaughtered bird while maintaining tension on the trussing band; bring the trussing band over a back of the slaughtered bird; twist the trussing band over the back of the slaughtered bird to create a cross-over point in the trussing band; pass the trussing band underneath a first and second hock of the slaughtered bird; pass the trussing band over the first and second hock of the slaughtered bird; and pass the trussing band underneath a first and second hock of the slaughtered bird.

In examples, the trussing apparatus is the trussing apparatus described above.

In examples, the trussing band slides in the band retaining means of the trussing apparatus.

In examples, further including picking up the trussing band.

In examples, further including retaining a portion of the trussing band against a movable rod using a tension of the trussing band.

In examples, retaining a second portion of the trussing band against the first and second hock further includes: wrapping a third portion of the trussing band around the first hock, and wrapping a fourth portion of the trussing band around the second hock, such that the first and second hocks are biased against one another using a tension of the trussing band.

In examples, the holders are the slaughtered bird holders described above.

In examples, furthering including determining the quality of the trussing with vision system.

In examples, the slaughtered bird is a poultry bird.

In examples, the poultry bird is selected from the group comprising a chicken and a turkey.

According to yet another example embodiment there is provided a trussing control system including: a vision system, the vision system including at least one image capture device for capturing at least one image of a slaughtered bird, a controller; a communication system; wherein the controller is programmed to: determine a size of a slaughtered bird based on the at least one image, and further programmed to calculate the required length a trussing band based on at least the determined size; receive information on the truss type for the slaughtered bird; communicate to a truss band joining system the size of required trussing band; control a trussing system to truss the slaughtered bird with the required truss type; and check the quality of the trussed slaughtered bird using the vision system.

In examples, the controller is a PLC.

In examples, the truss type is selected from legs and wings and legs only.

In examples, the slaughtered bird is a poultry bird.

In examples, the poultry bird is selected from the group comprising a chicken and a turkey.

According to another example embodiment there is provided a slaughtered bird trussed according to the method above.

In examples, the slaughtered bird is a poultry bird.

In examples, the poultry bird is a chicken.

In examples, the poultry bird is a turkey.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIG. 8 depicts a further embodiment of a slaughtered bird holder;

FIG. 9 depicts a further embodiment of a slaughtered bird holder;

DETAILED DESCRIPTION

In this description a slaughtered bird refers to a poultry bird such as chicken or turkey.

Figure 20:
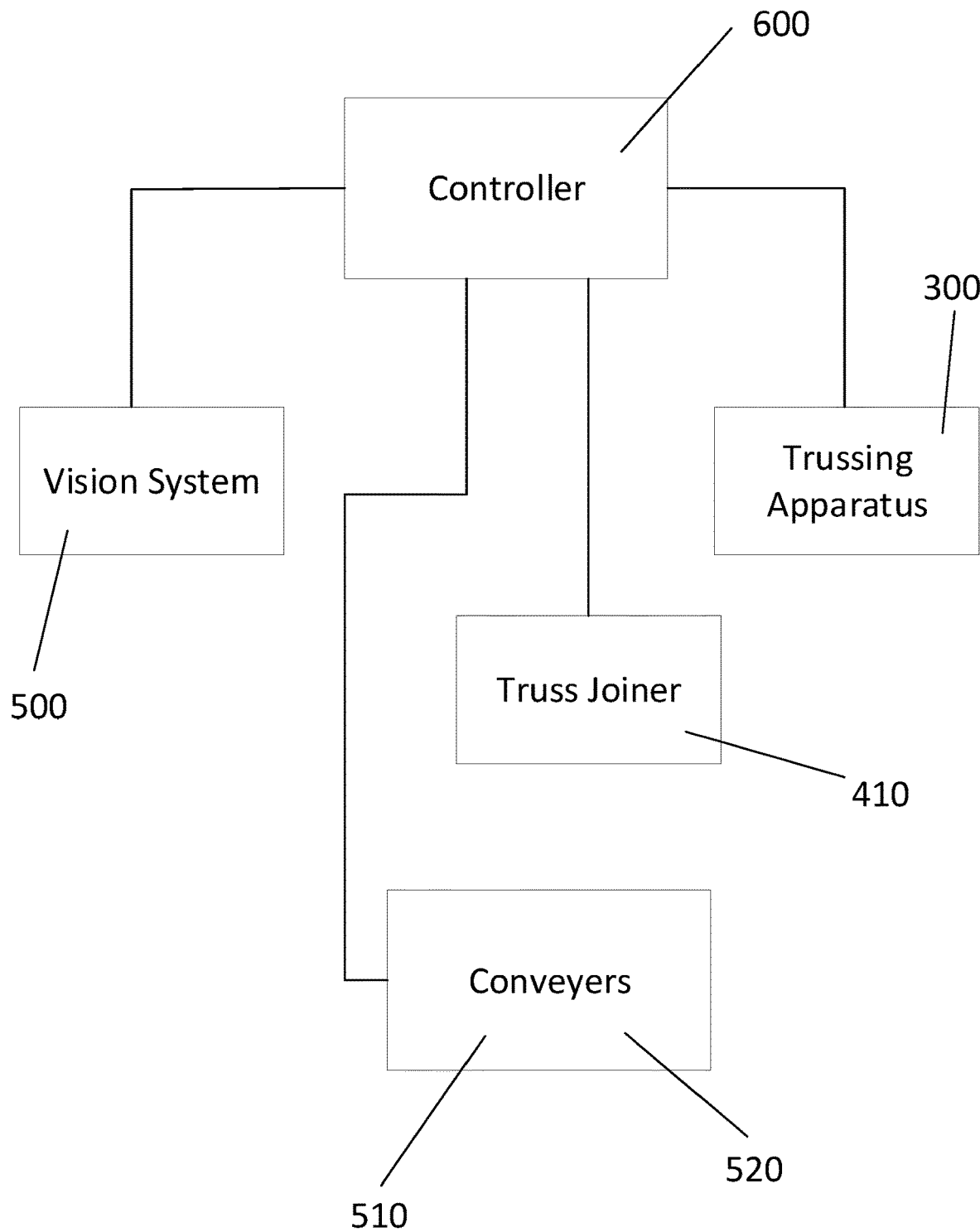
FIG. 20 depicts a block diagram of a trussing system.

A block diagram of the components of the system is shown in FIG. 20. Many of the components may be used individually or in combination. The components may be retrofitted either individually or in combination to an existing processing line. The system includes a controller 600, in some cases a PLC or any suitable computer system including memory and a least one communication device. The controller communicates with a vision system 500, at one or more conveyer systems 510, 520, one or more truss joining apparatus 410 and one or more trussing apparatus 300. The conveyers 510, 520 may include a number of slaughtered bird holders discussed below.

Figure 1:
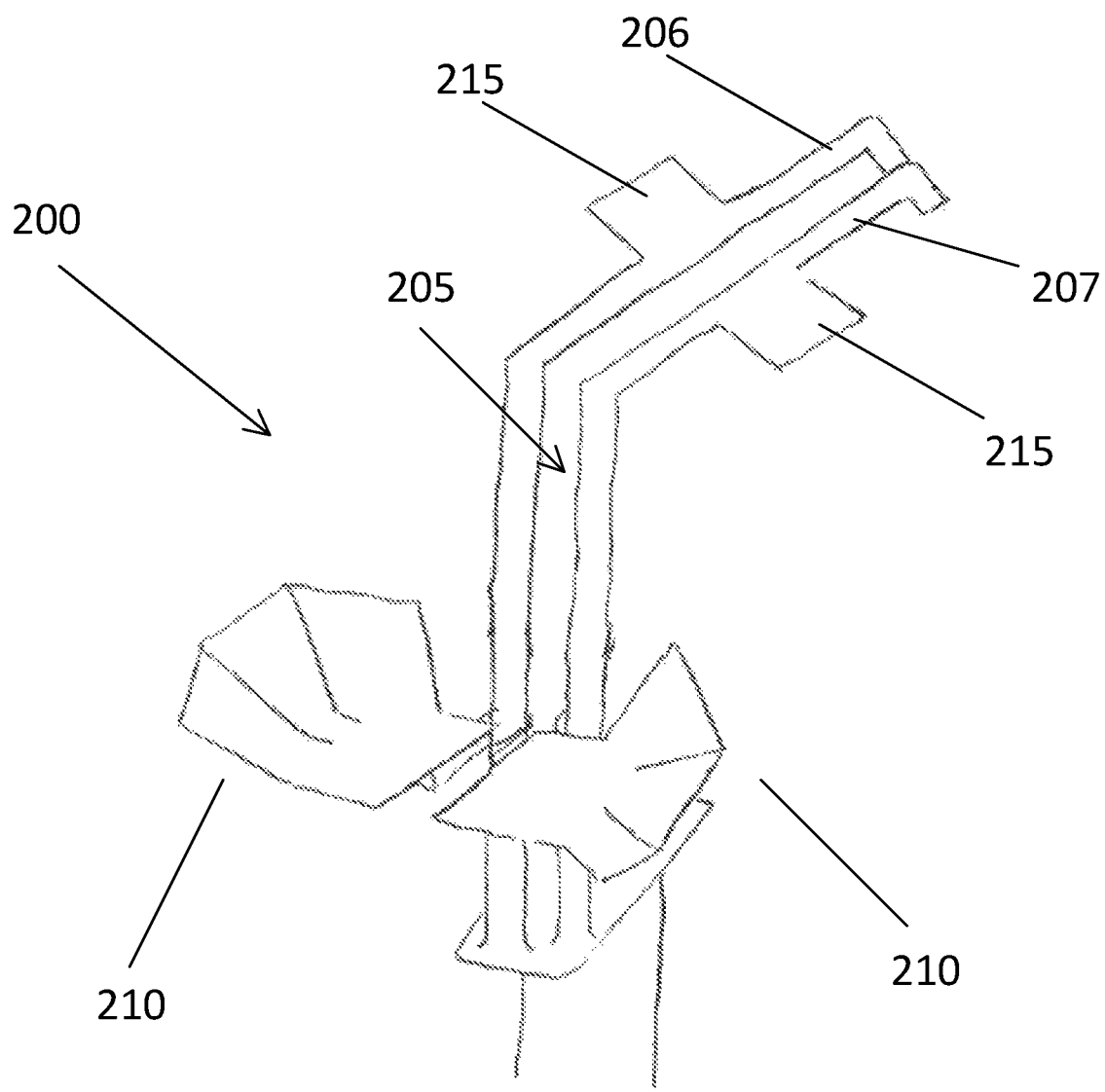
FIG. 1 depicts an embodiment of a slaughtered bird holder.

FIG. 1 depicts a non-limiting example of a slaughtered bird holder. The slaughtered bird holder 200 may be used to hold slaughtered birds for transport, trussing, or other uses depending on the applications of the slaughtered bird holder 200. The slaughtered bird holder 200 includes a slaughtered bird support 205 which is configured to support at least a part of a slaughtered bird. In some embodiments, the slaughtered bird support 205 may be configured so that, in use, at least a portion of the weight of the slaughtered bird rests in a stable configuration against the slaughtered bird support 205.

In some embodiments, the slaughtered bird support 205 comprises one or more substantially upright members which are configured to align with the backbone or spine of the slaughtered bird while the slaughtered bird is being held by the slaughtered bird holder 200. As a non-limiting example, the slaughtered bird support 205 may comprise two rods 206 and 207. The slaughtered bird may be placed in the slaughtered bird holder 200 so that the breast or front of the slaughtered bird is in direct contact with the rods 206 and 207, while the back of the slaughtered bird faces outwards from the slaughtered bird holder 200.

In some embodiments, the rods 206 and 207 may project normally from the slaughtered bird holder 200 along their entire respective lengths. In other embodiments, one or both of the rods 206 and 207 may include a dogleg or elbow at some point along their lengths so that a portion of the rod extends at an angle less than 90° with respect to the slaughtered bird holder 200. This may improve the stability of the slaughtered bird while it is being held by the slaughtered bird holder 200 as the front of the slaughtered bird may recline against the rods 206 and 207 in a more stable configuration.

In some embodiments, the spacing between the two rods 206 and 207 may be configured so that when the slaughtered bird is supported by the rods 206 and 207, the spine or backbone of the slaughtered bird lies between the rods 206 and 207—that is to say, each rod 206 and 207 is disposed on either side of the spine or backbone of the slaughtered bird. This may further improve the stability of the slaughtered bird while it is being held by the slaughtered bird holder 200 by ensuring that the centre of mass of the slaughtered bird lies between the rods 206 and 207.

In some embodiments, the two rods 206 and 207 may be substantially parallel. In other embodiments, the two rods 206 and 207 may not be parallel, and may flare out along their length. This may help keep the slaughtered bird stable as it is held in the slaughtered bird holder 200.

In other embodiments, a single rod or support member may be used as the slaughtered bird support 205. The size and/or shape of the slaughtered bird support 205 used may depend on at least the species and/or size of the slaughtered bird to be trussed.

The slaughtered bird holder 200 may also include further support members to support other parts of the slaughtered bird. In one embodiment, the slaughtered bird holder 200 includes one or more hock supports 210. The hock supports 210 are configured to support at least a part of the hock of the slaughtered bird. In one embodiment, the hock support 210 may comprise substantially flat panels or paddles which are angled to support the weight of the hocks of the slaughtered bird. The hock supports 210 may also include flanges or edge features which are configured to at least partially surround one or more hocks of the slaughtered bird. This may increase the overall stability of the slaughtered bird during trussing, and may help prevent the hocks of the slaughtered bird from moving during trussing.

The slaughtered bird holder 200 may also include one or more wing supports 215. The one or more wing supports 215 are configured such that when the slaughtered bird is held in the slaughtered bird holder 200, the wings of the slaughtered bird are supported by the wing supports 215. The wing supports 215 may also include flanges or edge features which are configured to at least partially surround one or more wings of the slaughtered bird. This may increase the overall stability of the slaughtered bird during trussing, and may also prevent the wings of the slaughtered bird from moving during trussing.

The slaughtered bird holder 200 may include any combination of slaughtered bird support 205, hock supports 210, and wing supports 215. In some embodiments, the slaughtered bird holder may include the slaughtered bird support 205 and the hock supports 210. In other embodiments, the slaughtered bird holder 200 may include the slaughtered bird support 205 and the wing supports 215. In yet another embodiment, the slaughtered bird holder 200 may include slaughtered bird support 205, hock supports 210, and wing supports 215. The exact combination and configuration of supporting members will vary on the applications of the slaughtered bird holder 200.

In use, a plurality of slaughtered bird holders may be coupled or connected to a conveyer. The conveyer may be configured to convey the slaughtered bird holders towards a trussing station. The conveyer may be an overhead conveyer or chain, a belt conveyor or a cone conveyer.

Figure 2:
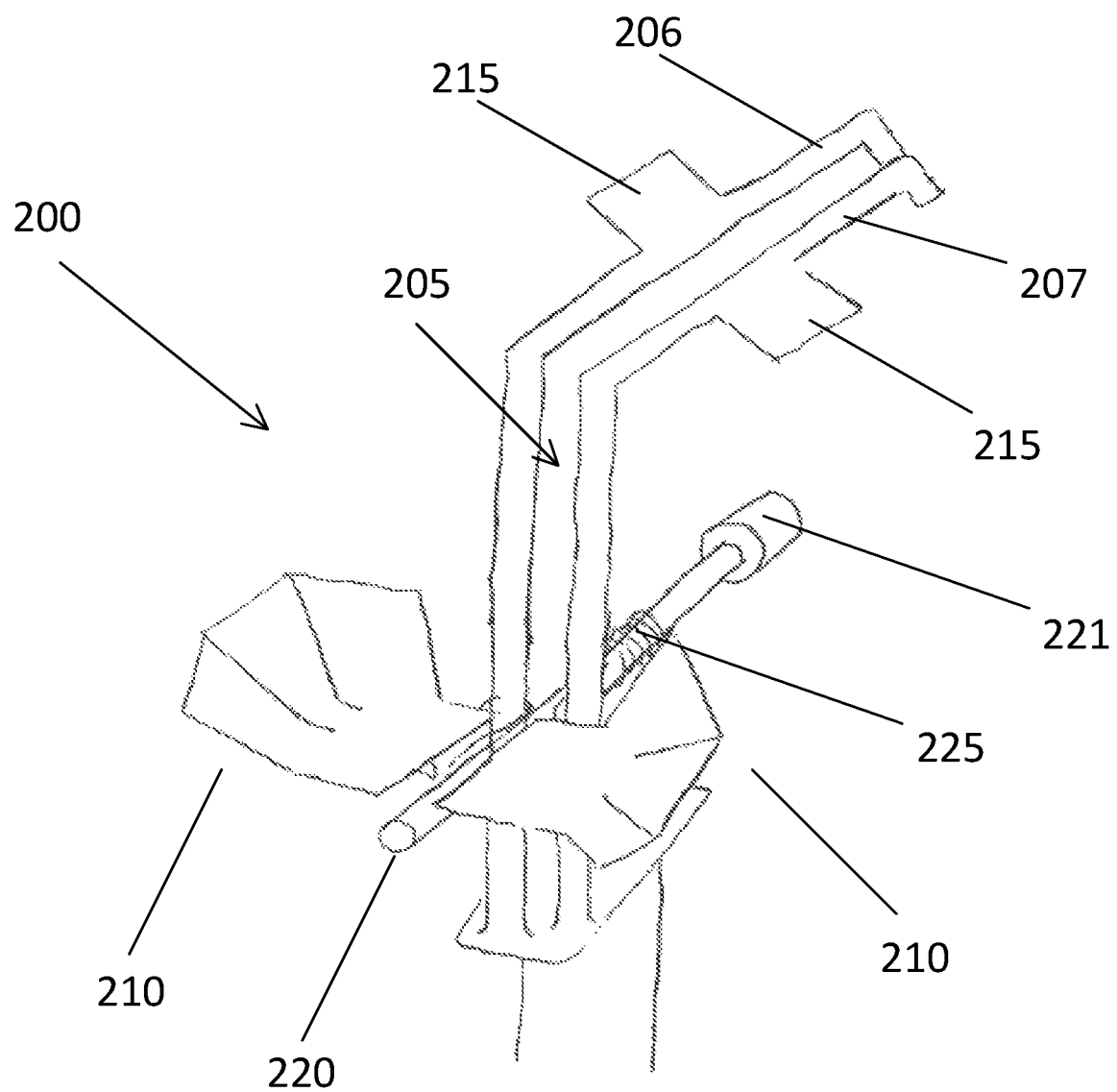
FIG. 2 depicts a further embodiment of a slaughtered bird holder.

FIG. 2 depicts a further embodiment of a slaughtered bird holder 200. In this embodiment, the slaughtered bird holder 200 also includes a shaft 220. In some embodiments, the shaft 220 may be configurable between two or more states and may be configured to retain a trussing band in the first state. In further embodiments, the shaft 220 may be configured to release a retained trussing band in a second state.

In some embodiments, the shaft 220 may be moveable, and configuring the shaft between states may comprise moving the shaft 220. The movement of the shaft 220 may comprise rotation of the shaft about its longitudinal axis or about any other axis. The shaft 220 may also or alternatively be translatable. In particular, the shaft 220 may be translatable in the direction of its longitudinal axis. In other embodiments, the shaft 220 may be translatable in any other direction, or may be capable of both rotation and translation. How the shaft 220 is configured between states may depend on the application of the shaft 220. Furthermore, if the shaft 220 is moveable, the degrees of freedom of movement of the shaft 220 may depend on the application of the shaft 220.

In some embodiments, the shaft 220 may configured to retain a trussing band and instead of moving to a second state to release the trussing band, the trussing band may be released by removing the trussing band from the shaft 220 using a robot.

In some embodiments, the shaft 220 may be retractable and extendable between two positions along its longitudinal axis. The shaft 220 may be configured to retain a trussing band in the extended position. The trussing band may be retained by at least a portion of the shaft 220 in the extended position by virtue of the inherent tension within the trussing band acting against the extended shaft 220. When the shaft 220 is retracted, the retained trussing band may be released by bringing the retained trussing band and shaft 220 out of contact with one another.

As a non-limiting example, the shaft 220 may be disposed at a level lower than the hocks of the slaughtered bird held in the slaughtered bird holder 200. If the slaughtered bird holder 200 includes hock supports 210, a portion of the legs or hocks of the slaughtered bird may protrude out of the hock supports 210 so that they can be trussed together. The shaft 220 may be configured so that in the extended position, an end or at least a portion of the shaft 220 is disposed immediately underneath the hocks of the slaughtered bird. If a trussing band with an inherent elasticity or tension is looped over the hocks of the slaughtered bird while the shaft 220 is extended, the underside of the trussing band will catch on, and will be retained by, the portion of the extended shaft 220 immediately underneath the hocks of the slaughtered bird when the trussing band is released. The trussing band will then be biased against the shaft 220 rather than the underside of the hocks of the slaughtered bird, meaning that further trussing can take place with a portion of the trussing band looped over the hocks of the slaughtered bird without exerting excessive force on the hocks. Avoiding excessive force on the hocks in this way may reduce the chance that the hocks are displaced from their ideal position during trussing.

When the hocks of the slaughtered bird are trussed together, the shaft 220 is retracted from its extended position. Retracting the shaft 220 from its extended position causes the shaft 220 to move past the retained trussing band until the two are no longer in contact. The portion of the trussing band which was previously retained by the shaft 220 is then free to move under its own tension, and is consequently caught and retained by the underside of the hocks of the slaughtered bird. This completes the process of trussing the hocks of the slaughtered bird together.

Figure 3:
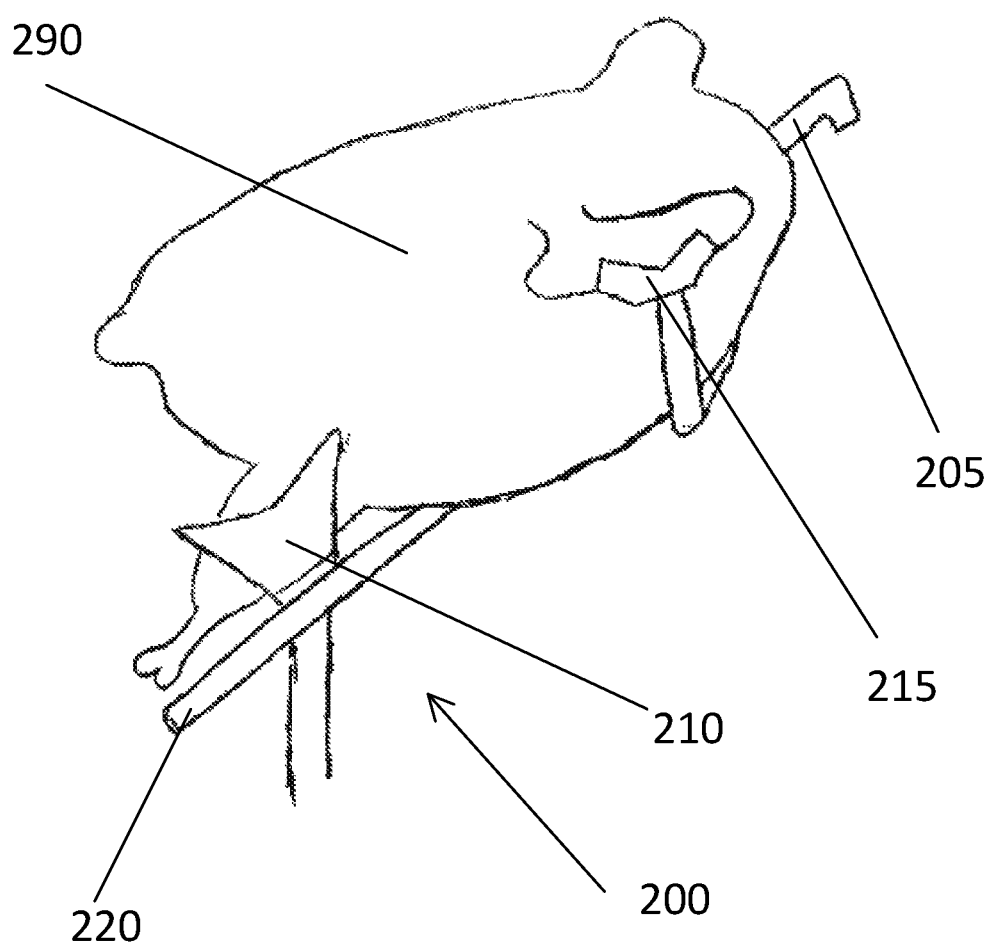
FIG. 3 depicts a slaughtered bird held in an embodiment of a slaughtered bird holder.

FIG. 3 depicts an embodiment of the slaughtered bird holder holding a slaughtered bird. The slaughtered bird 290 is held in the slaughtered bird holder. The slaughtered bird support 205 is supporting at least a portion of the weight of the slaughtered bird. The hock supports 210 are supporting at least a portion of the hocks of the slaughtered bird, while the wing supports 215 are supporting at least a portion of the wings of the slaughtered bird. The shaft 220 is disposed underneath the hocks of the slaughtered bird. In this embodiment, the shaft is in an extended position and is configured to retain a trussing band. In this depicted embodiment, a portion of the shaft 220 is disposed immediately underneath the hocks of the slaughtered bird in the extended position.

Although the above example uses a shaft 220 disposed underneath the hocks of a slaughtered bird, other configurations and arrangements of the shaft 220 may be used where appropriate. In some embodiments, the shaft 220 may be configured so that the extended position of the shaft is disposed above of, or to the either side of, the hocks of the slaughtered bird. In other embodiments, the extended position of the shaft 220 may be disposed relative to the wings or other part of the slaughtered bird, rather than the hocks. Furthermore, it is possible that multiple shafts 220 may be used in multiple configurations relative to a single slaughtered bird or slaughtered bird holder 200. As a non-limiting example, a single slaughtered bird holder 200 could include two or more shafts 220 such the shafts 220 extend above and below the hocks of the slaughtered bird. In this way, a trussing band could be looped around the hocks of the slaughtered bird without exerting significant tension on either the upper side or the lower side of the hocks of the slaughtered bird. The number and configuration of the shafts 220 will depend on their application.

In some embodiments, the shaft 220 may be coupled to the slaughtered bird holder 200. The shaft 220 may be integrally formed with the slaughtered bird holder 200, or may be separately attached to the slaughtered bird holder 200. In this way, the slaughtered bird holder 200 and shaft 220 may be conveyed concomitantly towards or away from a trussing station.

In other embodiments, the shaft 220 may be separate from the slaughtered bird holder 200. The shaft 220 may be located in a fixed position with respect to a conveyer. In particular, the shaft 220 may be located in a trussing station adjacent or nearby the conveyer. In these embodiments, each slaughtered bird holder 200 may be conveyed to the fixed shaft 220 within the trussing station. The shaft 220 may be used during the trussing of the slaughtered bird held in the slaughtered bird holder 200 to retain the trussing band during trussing. The number and arrangements of shafts 220 at fixed positions will depend on the applications of the trussing line.

In other embodiments, the shaft 220 may be separate from the slaughtered bird holder 200, but may be conveyed by the same conveyer or conveyed concomitantly by a separate conveyer. In this way, although the slaughtered bird holder 200 and shaft 220 may be separate, they may arrive at a trussing station at the same (or a similar) time. In some embodiments, each slaughtered bird holder 200 may be associated with a separate shaft 220. As the two are concomitantly conveyed towards a trussing station, the shaft 220 may be used to retain a trussing band during the trussing of a slaughtered bird held in the slaughtered bird holder 200 associated with that shaft 220. The exact relationship between the slaughtered bird holders 200 and shafts 220 may depend on the applications or specifics of the trussing line.

In some embodiments, the shaft 220 may include a first biaser 225 which biases the shaft 220 into a first configurable state. In further embodiments, a second biaser 230 may be arranged to ensure that the shaft 220 is configured into a second configurable state at a certain time or position. In embodiments where the shaft 220 is coupled or attached to the slaughtered bird holder 200, the second biaser 230 may be disposed separate from the slaughtered bird holder 200. In embodiments where the shaft 220 is separate from the slaughtered bird holder 200, the second biaser 230 may be coupled or attached to the slaughtered bird holder 200.

As a non-limiting example, a shaft 220 may be configured to extend and retract along its longitudinal axis, and may be coupled to a slaughtered bird holder 200. The slaughtered bird holder 200 may in turn be coupled to or conveyed by a conveyer. The slaughtered bird holder 200 may further include a spring 225 as a first biaser which biases the shaft 220 into a retracted state by urging an end 221 of the shaft 220 outwards from the slaughtered bird holder 200. In this embodiment, the shaft 220 will remain retracted until the end 221 is pushed towards the slaughtered bird holder 200.

Figure 4:
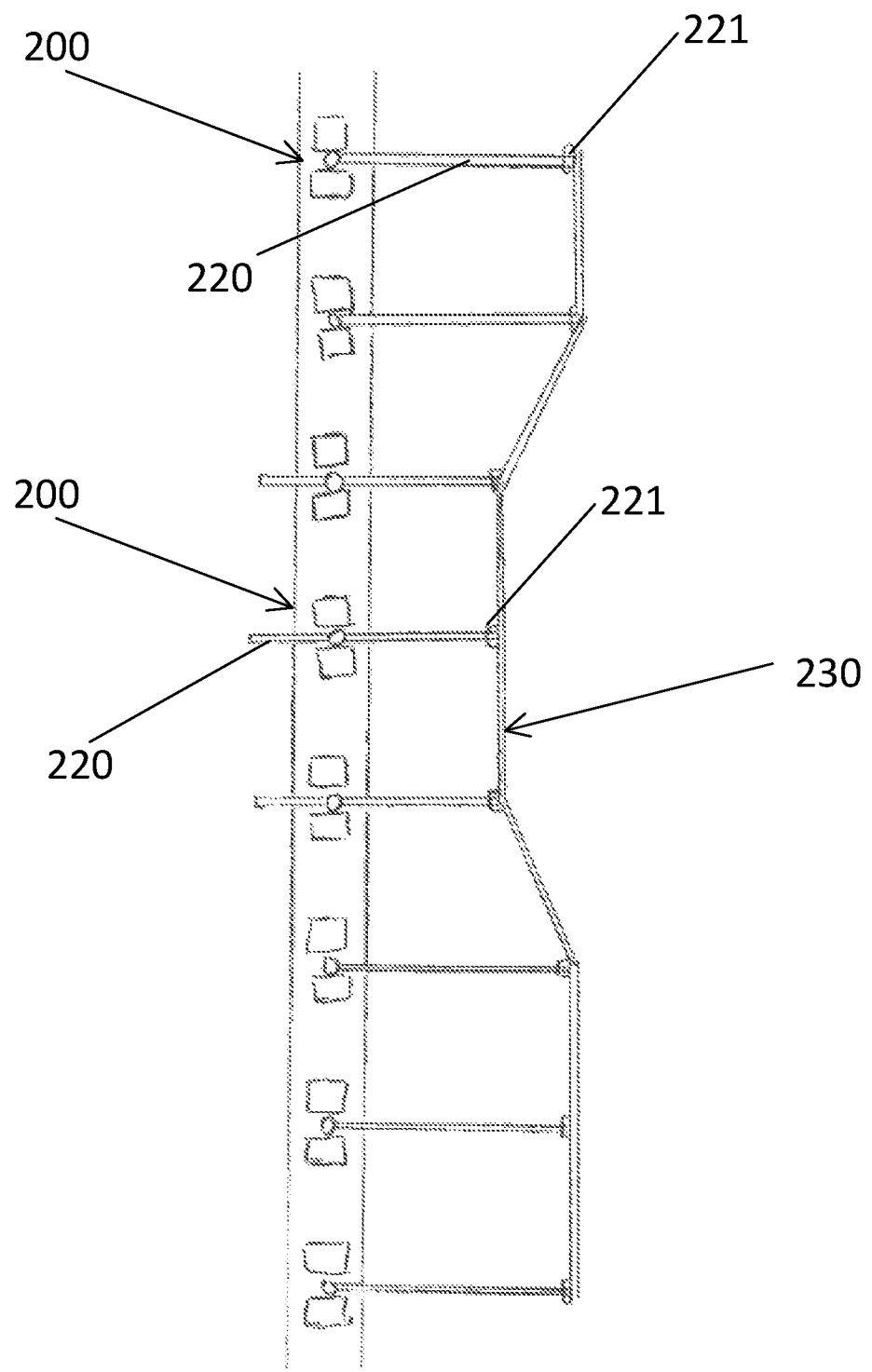
FIG. 4 depicts a plurality of bird holders including shafts biased against a guide rail.

FIG. 4 depicts a non-limiting example of a plurality of slaughtered bird holders interacting with a second biaser. In this example, to ensure that the shaft 220 is appropriately extended when the slaughtered bird holder 200 approaches a trussing station, a guide rail 230 may be arranged adjacent to the conveyer to act as a second biaser to bias the end 221 of the shaft 220 towards the slaughtered bird holder 200. The end 221 of the shaft 220 may abut against the guide rail 230. The distance between the guide rail 230 and the slaughtered bird holder 200 may allow for the end 221 of the shaft 220 to be biased to its fullest extent away from the slaughtered bird holder 200 by the spring 225 when the slaughtered bird holder 200 is sufficiently far away from the trussing station. As the slaughtered bird holder 200 approaches the trussing station, the distance between the guide rail 230 and the slaughtered bird holder 200 may narrow such that the abutting end 221 of the shaft 220 is brought closer towards the slaughtered bird holder 200 against the force of the spring 225. The guide rail 230 may be configured so that when the slaughtered bird holder 200 is positioned at or within the trussing station, the distance between the guide rail 230 and the slaughtered bird holder 200 is such that the end 221 of the shaft 220 is pushed close enough to the slaughtered bird holder 200 to extend the shaft 220 so that it may retain a trussing band. If the slaughtered bird holder 200 is configured to be conveyed while trussing is performed simultaneously, the distance between the guide rail 230 and slaughtered bird holder 200 may be kept constant through the trussing station so that the shaft 220 may be extended throughout the trussing procedure. As the slaughtered bird holder 200 approaches the exit of the trussing station, the distance between the guide rail 230 and slaughtered bird holder 200 may gradually or suddenly increase so that the shaft 220 retracts as the slaughtered bird holder 200 exits the trussing station due to the spring 225 urging the end 221 away from the slaughtered bird holder 200, ensuring that any trussing band retained by the shaft 220 is released as the trussing procedure finishes.

Other embodiments of a first and/or second biaser 225 and 235 may also be used depending on the application of the slaughtered bird holder 200 and shaft 220. In other non-limiting examples, a rotating or moving cam may be used in place of guide rail 230 to engage with and abut the end 221 of the shaft 220 to urge the end 221 closer towards the slaughtered bird holder 200 to extend the shaft 220. The rotation or timing of the cam could be mechanically or electronically indexed to the conveyance of the slaughtered bird holder 200. A rotating cam could also be coupled to, or abut against, the shaft 220 in embodiments where the shaft 220 is located in a fixed position with respect to the conveyer. The rotating cam could periodically extend and retract the shaft 220 relative to the slaughtered bird holder 200 to ensure that the shaft 220 could retain a trussing band at the appropriate times. In yet further embodiments where cost or complexity is less of a factor, the first and/or second biaser 225 and 230 could be replaced by one or more servomotors or linear actuators to actuate the shaft 220 between states. The specifics and arrangements of the first and/or second biasers 225 and 230 will depend on how the shaft 220 is configured between states, and the overall arrangement of the shaft 220 and the slaughtered bird holder 200.

Figure 5:
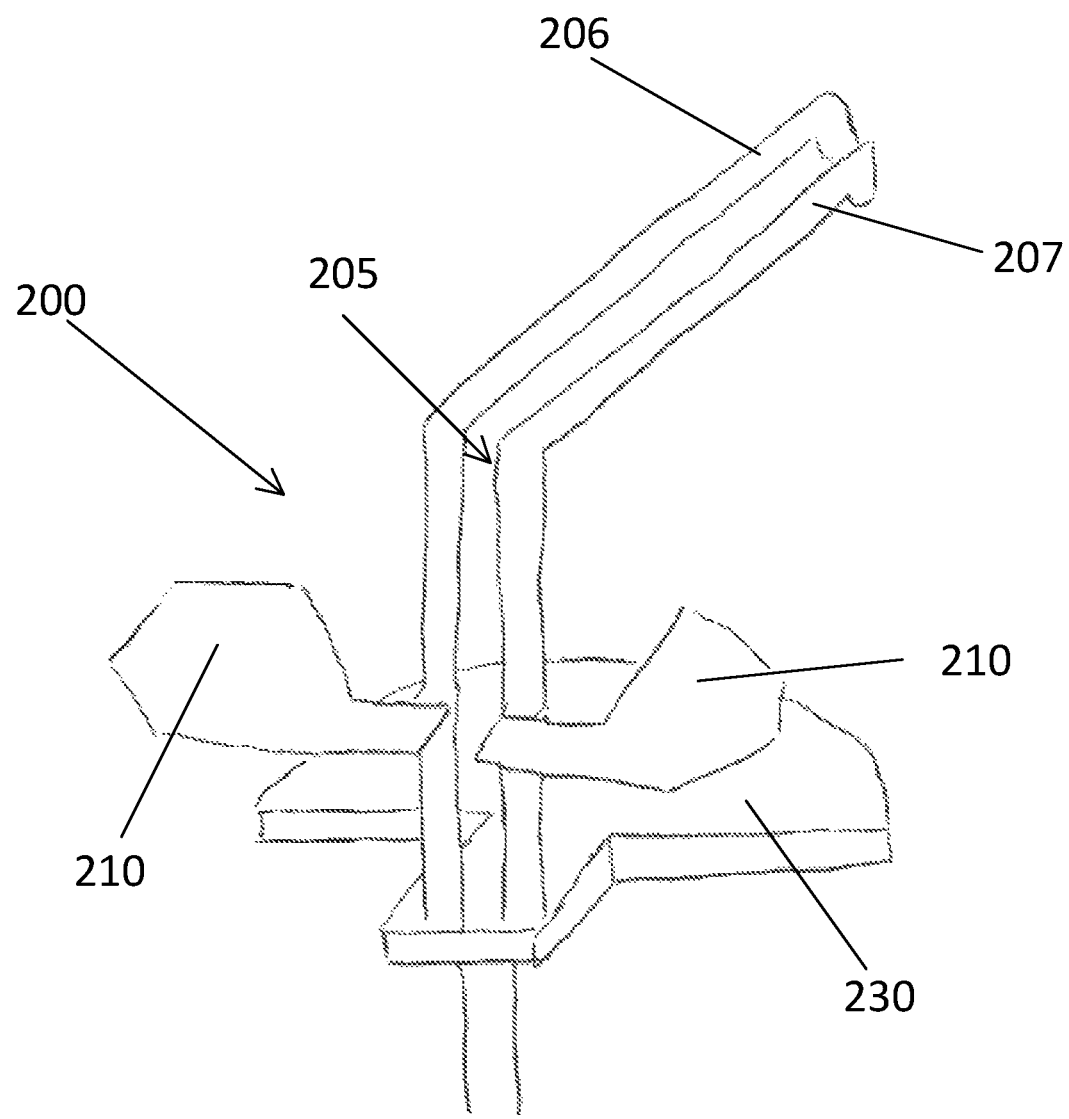
FIG. 5 depicts a further embodiment of a slaughtered bird holder.

FIG. 5 depicts an embodiment of the slaughtered bird holder 200 where the second biaser 230 is coupled or attached to the slaughtered bird holder 200. In this embodiment, the second biaser 230 is a hemispherical cam or paddle which is shaped to abut a shaft 220 (not pictured) disposed in a fixed position separate from the slaughtered bird holder 200. As the slaughtered bird holder 200 is conveyed down a conveyer, the second biaser 230 is brought into abutment with an actuator (not pictured) which biases the shaft 220 into the extended position. Any appropriate actuator may be used, such as a mechanical linkage between a depressible actuator and the shaft 220.

In some embodiments, the shaft 220 may further include a trussing band retainer or trussing band retaining feature. The trussing band retainer or feature may be shaped or configured to particularly retain the trussing band by virtue of the inherent tension within the trussing band. In one embodiment, the trussing band retainer may comprise a hook which is integrally formed with the shaft 220. The hook may be configured to catch and retain the trussing band by tensioning the trussing band against the curve of the hook. Releasing the retained trussing band may involve rotating the shaft 220 and hook so that the trussing band is no longer tensioned against the curve of the hook. In other embodiments, the trussing band retainer may comprise an annular groove or notch on the shaft 220, and may retain and release the trussing band in the same manner. The exact geometry of the trussing band retainer may depend on the application of the shaft 220.

Figures 6, 7:
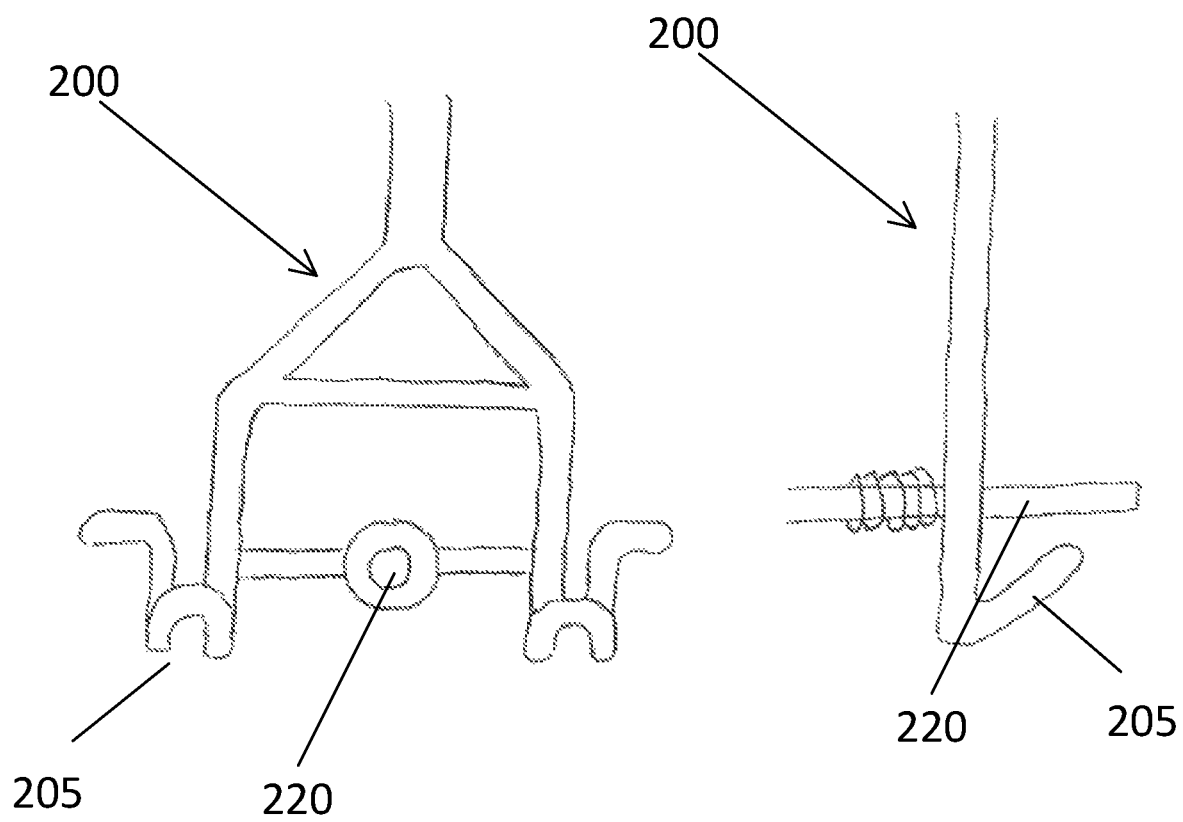
FIG. 6 depicts a further embodiment of a slaughtered bird holder.
FIG. 7 depicts a further embodiment of a slaughtered bird holder.

The shaft 220 can be used with a wide variety of different slaughtered bird holders and slaughtered bird support configurations. FIGS. 6 and 7 depict an embodiment of a slaughtered bird holder which resembles a conventional overhead conveyer shackle. In this configuration, the shaft 220 may be disposed between the slaughtered bird supports 205 to assist during trussing. This embodiment of the slaughtered bird holder 200 may be beneficial or advantageous for retrofitting existing slaughtered bird processing plants or other applications which rely on using conventional overhead shackles as slaughtered bird holders.

A further embodiment of a slaughtered bird holder 200 including a shaft 220 is depicted in FIGS. 8 and 9. In this embodiment, the slaughtered bird holder 200 resembles a conventional 'cone' slaughtered bird holder which may be used in existing manual slaughtered bird trussing plants or slaughtered bird trussing stations. The slaughtered bird holder 200 includes a slaughtered bird support 205 which is configured to hold a slaughtered bird upright during trussing. A shaft 220 is disposed towards the bottom of the slaughtered bird holder 200 and is used as a trussing aid. This may be used when minimal changes to a slaughtered bird trussing plant that already uses conventional 'cone' style slaughtered bird holders are desired.

Figure 19A:
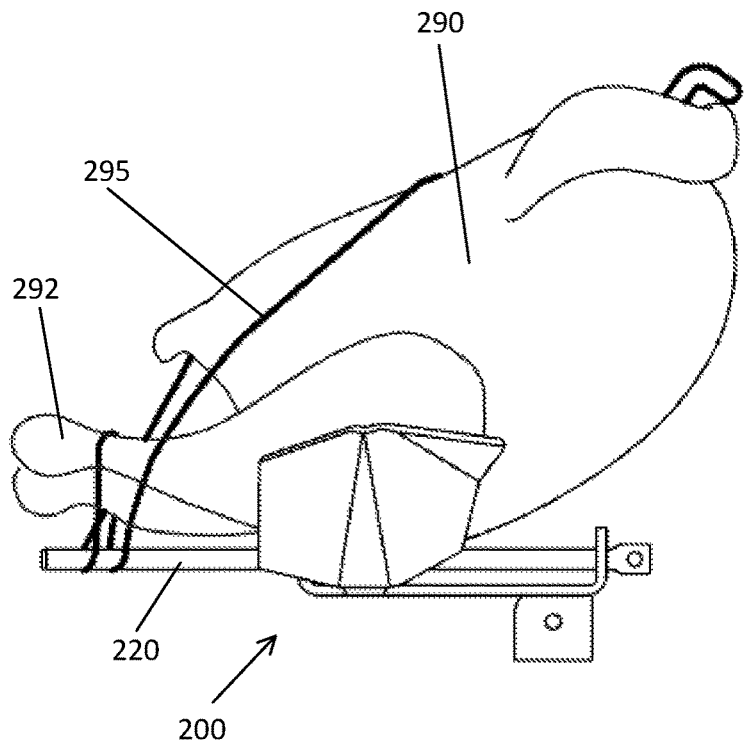
FIG. 19A depicts a slaughtered in an embodiment of slaughtered bird holder with the shaft in the extended position.
Figure 19B:
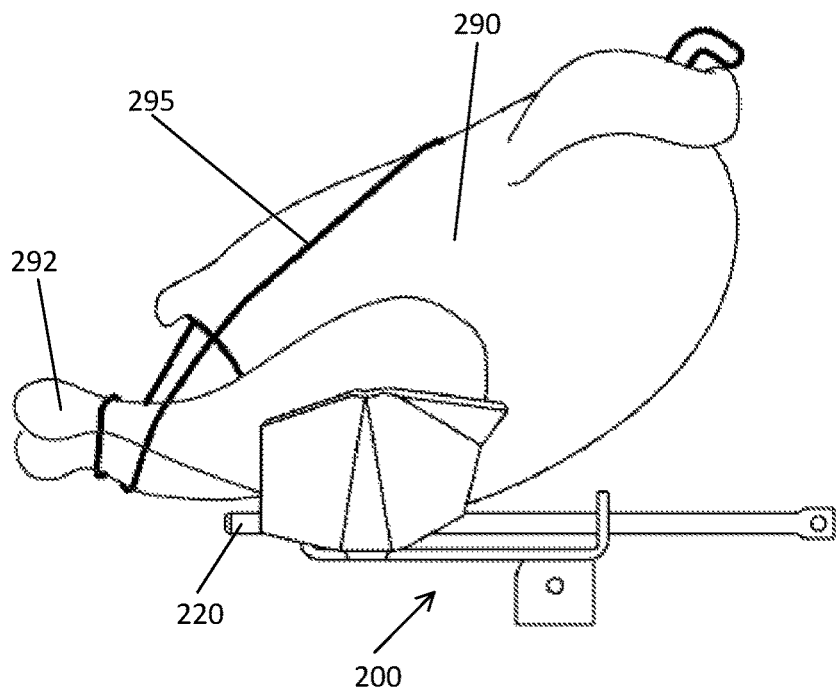
FIG. 19B depicts a slaughtered in an embodiment of slaughtered bird holder with the shaft in the retracted position.

An example use of the slaughtered bird holder 200 and shaft 220 is illustrated in FIGS. 19A and 19B. In FIG. 19A the shaft 220 is extended and the trussing band 295 is around the shaft 220 and the hocks 292 of the slaughtered bird 290. In FIG. 19B the shaft 220 is retracted and the trussing band 295 is only around the hocks 292 of the slaughtered bird 290. The slaughtered bird holder 200 and shaft 220 may in one embodiment be used with a manually trussing line or may as described below be used with an automated trussing line.

Figure 10:
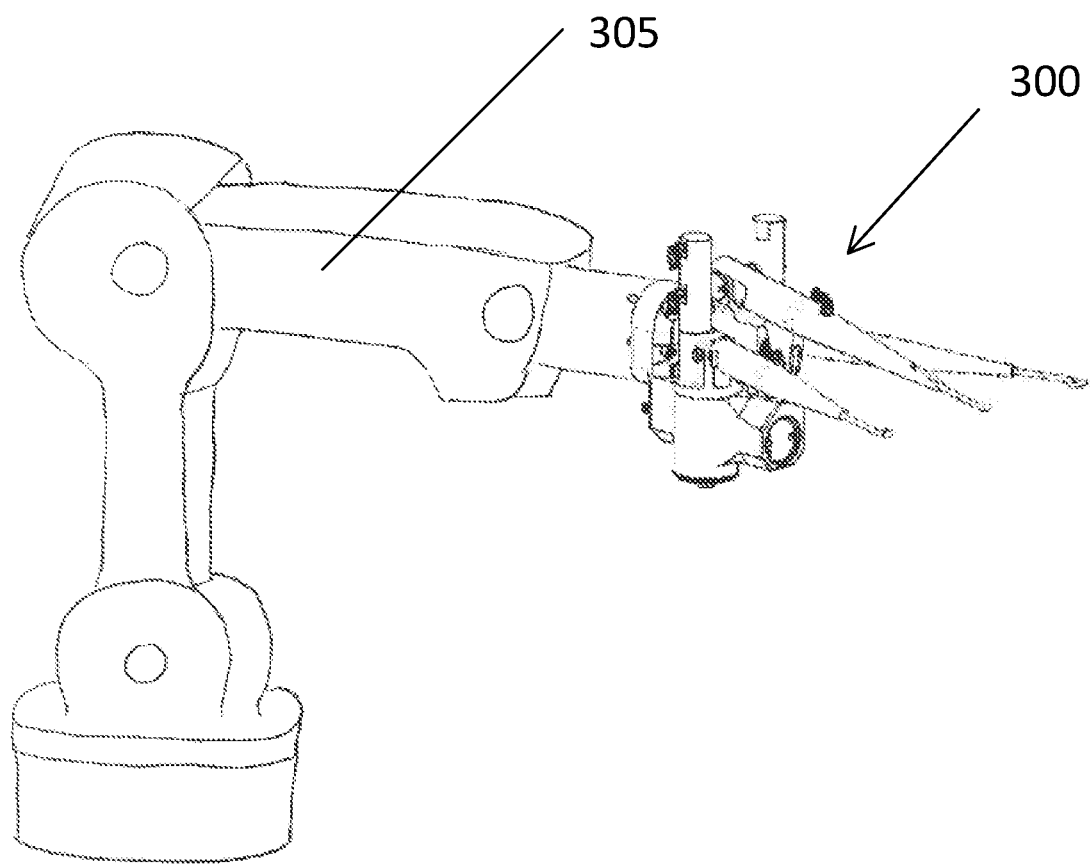
FIG. 10 depicts an embodiment of a trussing apparatus.

FIG. 10 depicts one embodiment of a trussing apparatus 300. The trussing apparatus 300 may be configured to truss a slaughtered slaughtered bird with a trussing band. In some embodiments, the trussing apparatus 300 may be the end effector of a robot or a robotic arm 305. The robotic arm 305 may translate and rotate the trussing apparatus 300 through the use of one or more actuators.

Figure 11:
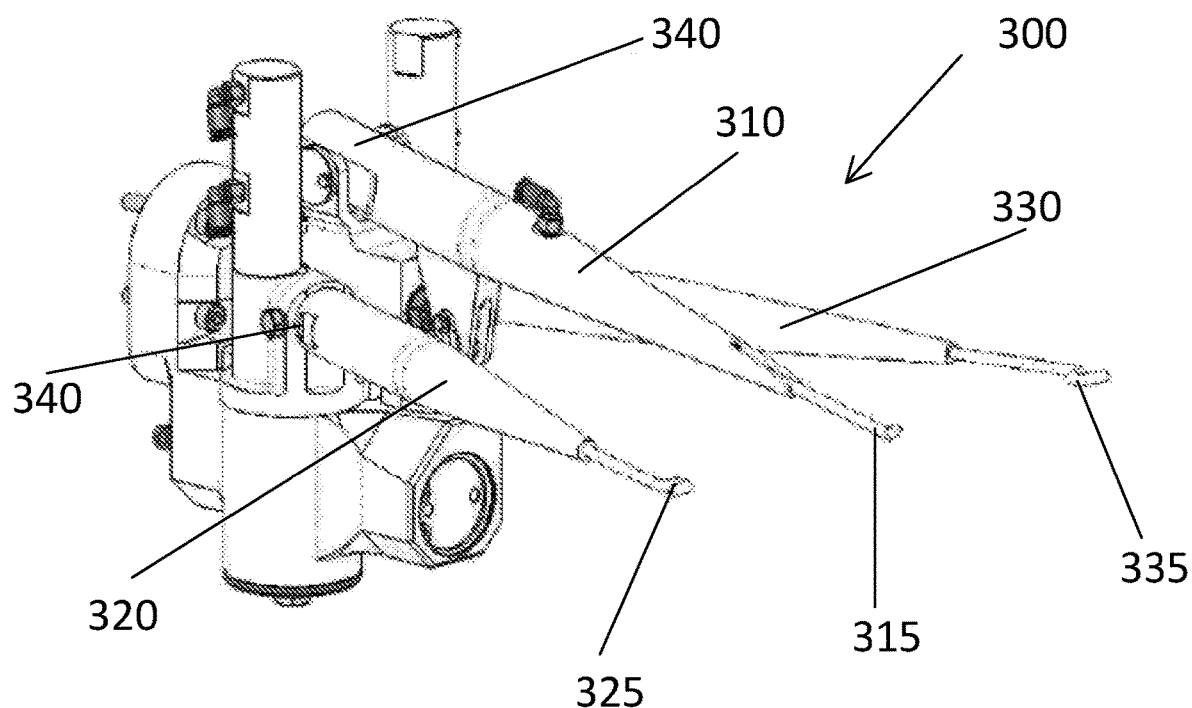
FIG. 11 depicts a further embodiment of a trussing apparatus.

FIG. 11 depicts a further embodiment of a trussing apparatus 300. The trussing apparatus 300 may include a first member 310 having a first trussing band retainer 315, a second member 320 having a second trussing band retainer 325, and a third member 330 having a third trussing band retainer 335. The first, second, and third members 310, 320, and 330 may be appendages of a robotic end effector. While illustrated with three members two or more members may be used.

In some embodiments, each member of the trussing apparatus 300 may be independently actuatable to translate or rotate through space. The trussing apparatus 300 may include actuators 350 to actuate one or more of the members 310, 320, and/or 330. In some embodiments, each member of the trussing apparatus may be translatable through three degrees of freedom. In other embodiments, one end of each member 310, 320, and/or 330 may be fixed with respect to the trussing apparatus 300, while the other end of each member may be translatable through three degrees of freedom. In particular embodiments, one or more of the members 310, 320, and/or 330 may be retractable or extendable along their longitudinal axes. In some embodiments, each member of the trussing apparatus 300 may be capable or rotating about their respective longitudinal axes or about any other axes. The degrees of freedom afforded to each of the first, second, and third members 310, 320, and 330 of the trussing apparatus 300 may depend on the applications of the trussing apparatus 300.

In some embodiments, one or more of the first, second, or third trussing band retainers 315, 325, or 335 may comprise a hook. The hook may be configured to retain a trussing band by tensioning the trussing band against the curve of the hook. The member of the trussing apparatus 300 associated with that trussing band retainer may be configured to release a retained trussing band by rotating the hook so that the trussing band is no longer tensioned against the curve of the hook. In other embodiments, one or more of the first, second, or third trussing band retainers 315, 325, or 335 may comprise an annular groove. The annular groove may be configured to retain a trussing band by tensioning or catching the trussing band within the annular groove, and the member of the trussing apparatus 300 associated with that trussing band retainer may be configured to release the retained trussing band by rotating about its longitudinal axis.

In one embodiment, the trussing apparatus 300 is a robotic end effector. The first, second, and third members 310, 320, and 330 may be appendages of the robotic end effector 300. Each member may terminate at a first end and a second end. The first end may be a ball joint which is configurably fixed to the robotic end effector 300. Each ball joint associated with each member 310, 320, and 330 may be disposed on the end of the robotic end effector 300 in approximately 120° increments about a constant radius. The ball joints may be actuatable to rotate or translate each associated member with respect to the robotic end effector 300. In particular, each member 310, 320, and 330 may be rotatable along their pitch, yaw, and roll axes. Each member 310, 320, and 330 may be retractable or extendible along their respective longitudinal axes.

The second end of each member may substantially comprise of its associated trussing band retainer 315, 325, and 335. In one embodiment, the first and second members 310 and 320 may terminate in trussing band retainers 315 and 325 which comprise hooks. In a further embodiment, the third member 330 may terminate in a trussing band retainer 335 which comprises an annular groove. In other embodiments, the trussing band retainers 315, 325, and 335 may be disposed at some other position along the length of its associated member 310, 320, or 330.

In some embodiments, one or more of the members 310, 320, 330 and/or trussing band retainers 315, 325, 335 may be connected to or associated with one or more load cells 340. The one or more load cells 340 may be configured to determine and communicate a load supported by the associated members 310, 320, 330 and/or trussing band retainers 315, 325, 335. If the one or more load cells 340 are associated with one or more trussing band retainers 315, 325, 335, the one or more load cells 340 may be configured to determine and communicate the tension exerted by the trussing band on the one or more associated trussing band retainers 315, 325, 335. The measured tension exerted by the trussing band on the one or more trussing band retainers 315, 325, 335 can be used as feedback to a control system, and allows the actions of the trussing apparatus 300 to be modified during the trussing process.

Figure 12:
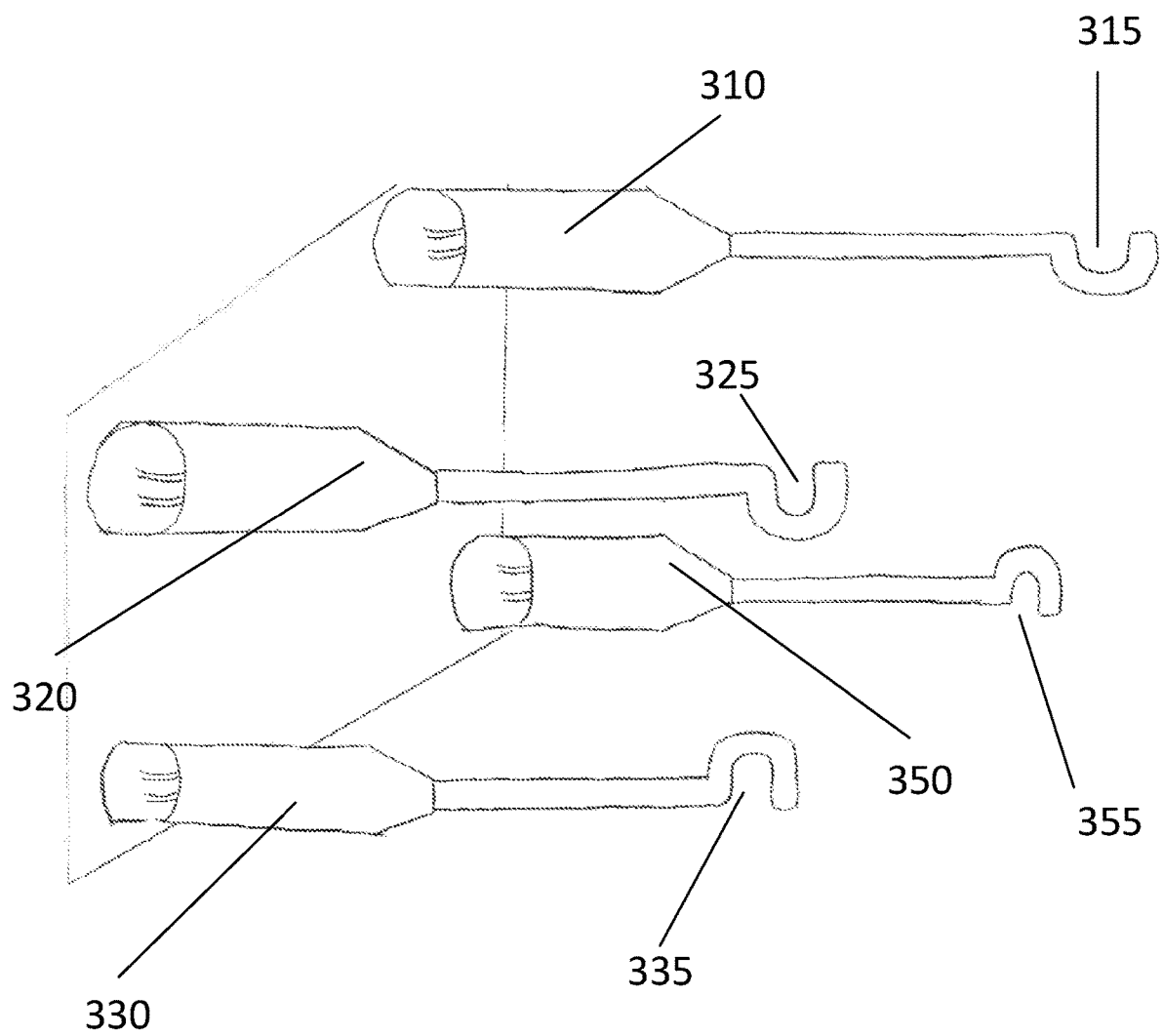
FIG. 12 depicts a further embodiment of a trussing apparatus.

FIG. 12 depicts a further embodiment of the trussing apparatus 300. In this embodiment, the trussing apparatus includes a first, second, third, and fourth member 310, 320, 330, and 350. In this non-limiting example, all of the trussing band retainers 315, 325, 335, and 355 are hooks, although other embodiments may include various configurations of trussing band retainers. The number of members and the configuration of trussing band retainers will depend on the application of the trussing band apparatus 300.

Figure 15A:
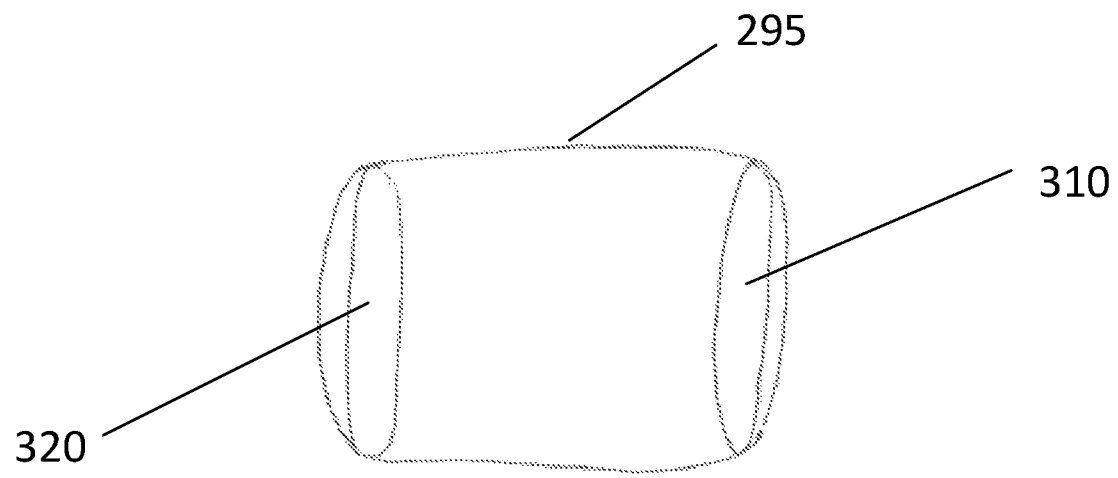
FIG. 15A depicts an embodiment of trussing apparatus members in a first orientation.
Figure 15B:
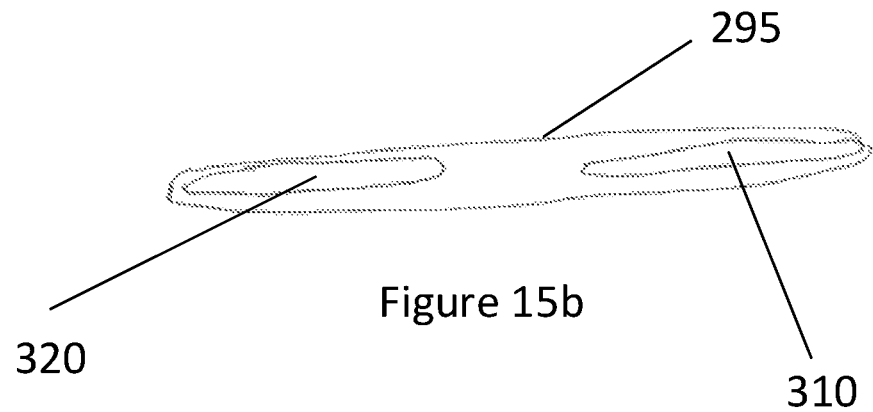
FIG. 15B depicts an embodiment of the trussing apparatus members of FIG. 15A in a second orientation.

Referring to FIGS. 15A and 15B the shape of the trussing apparatus members 310, 320 will be determined by the application of the trussing apparatus and need not be restricted to straight rods. Each member 310, 320 may include several diverging portions. Two or more members of the members may be configured such that for a portion of the length of the members have a first transverse axis larger than a second transverse axis at the same location. The portion may be for example rectangular, oval and obround. Rotating the members so that the first axis of both members is parallel as seen in FIG. 15A spreads a trussing band 295 when the trussing band 295 is located on the portion of the length having a first transverse axis larger than a second transverse axis at the same location. When the members 310, 320 are collinear as seen in FIG. 15B the trussing band 295 is no longer spread.

Figure 13:
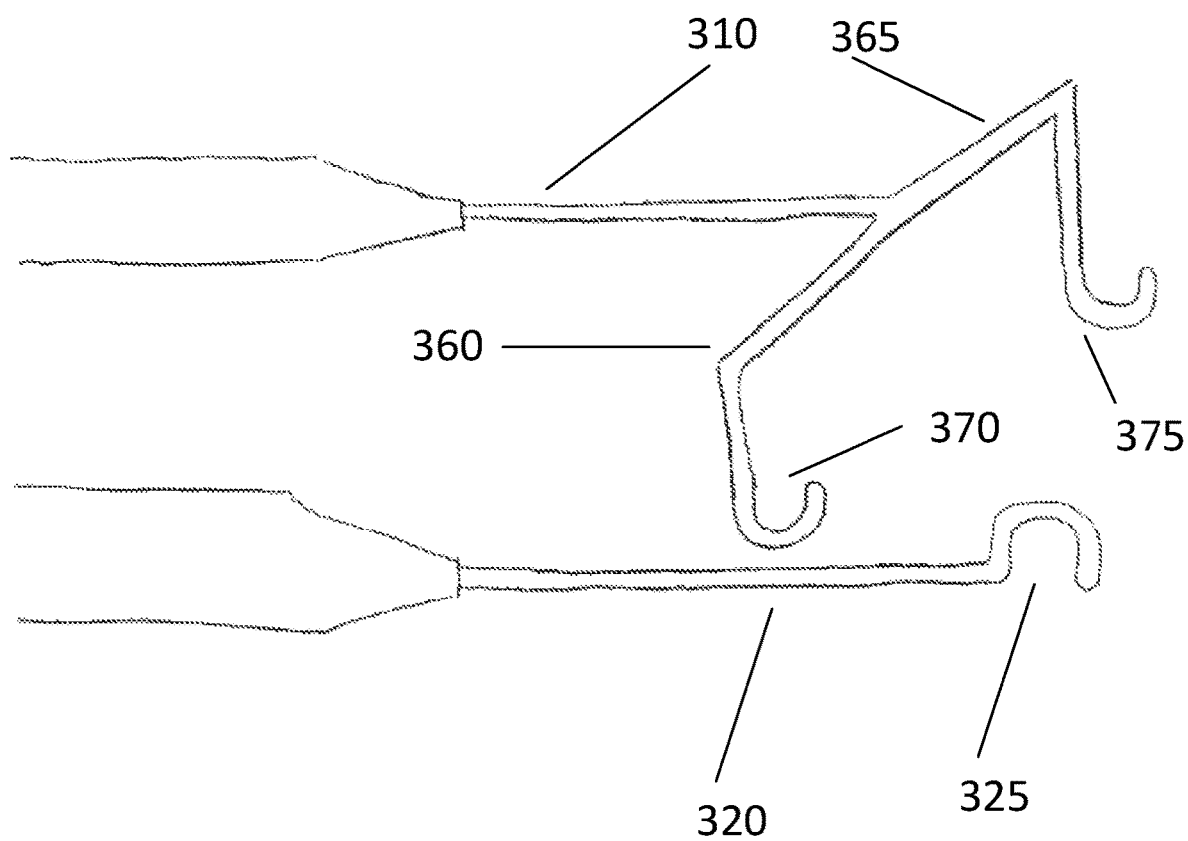
FIG. 13 depicts a further embodiment of a trussing apparatus.

Furthermore, each member may include more than one trussing band retainer. FIG. 13 depicts a further embodiment of the trussing apparatus 300. In this embodiment, the first member 310 of the trussing apparatus 300 consists of a shaft which diverges into two rectangular sections 360 and 365. The first member 310 of the trussing band apparatus 300 includes two trussing band retainers, 370 and 375. In this non-limiting example, each of the trussing band retainers 370 and 375 of the first member 310 of the trussing apparatus 300 are hooks. In other embodiments, a range of different trussing band retaining shapes may be used. In this embodiment, the trussing band retainer also includes a second member 320 with a second trussing band retainer 325. The second trussing band retainer 325 may also vary in size or shape depending on the application.

Figure 14:
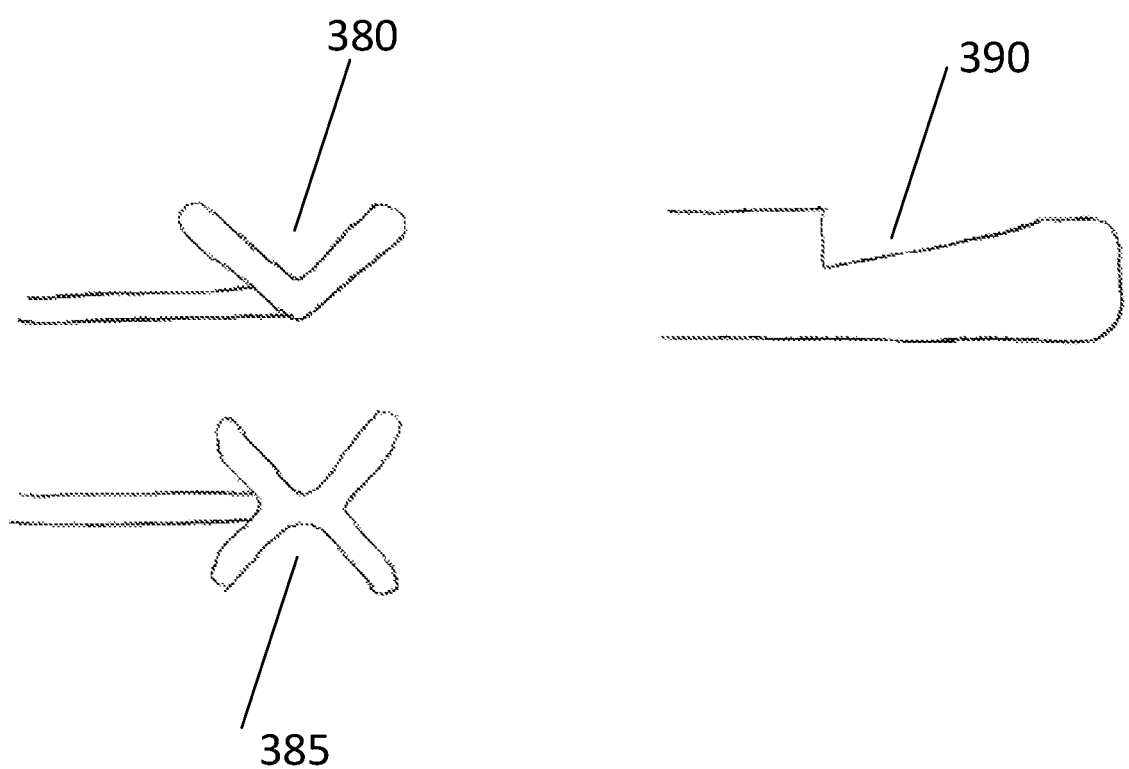
FIG. 14 depicts several embodiments of a trussing band retainer.

Different shapes of trussing band retainers can be used depending on the application of the trussing apparatus. FIG. 14 depicts various embodiments of trussing band retainers including a chevron-shaped trussing band retainer 380, a substantially 'X' shaped trussing band retainer 385, and an angled notch trussing band retainer 390. These respective embodiments are non-limiting, and it will be apparent that a wide variety of shapes and configurations can be used as trussing band retainers depending on the application of the trussing apparatus 300.

Referring to FIGS. 16A to 16D an apparatus for joining trussing bands is illustrated. The apparatus includes a joining apparatus 410. The joining apparatus being usable to join an adjustable length of a trussing band 295 around a jig 415.

Figure 16A:
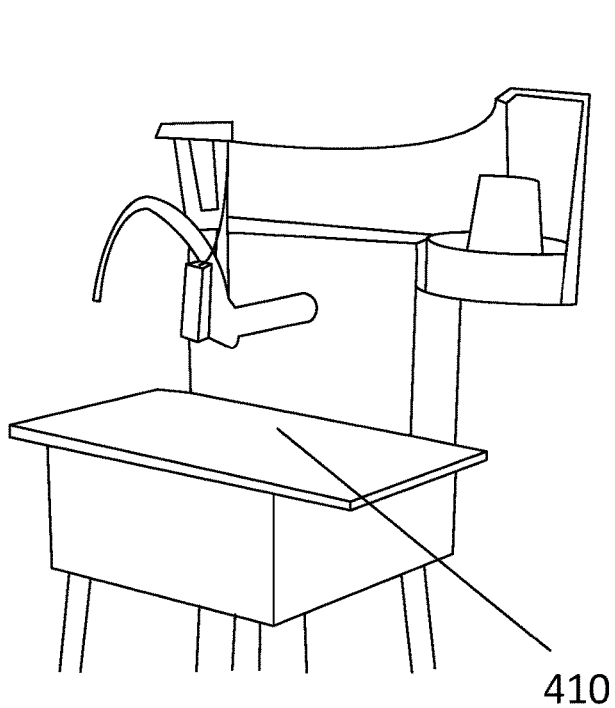
FIG. 16A depicts an embodiment of a trussing band joining apparatus.
Figure 16B:
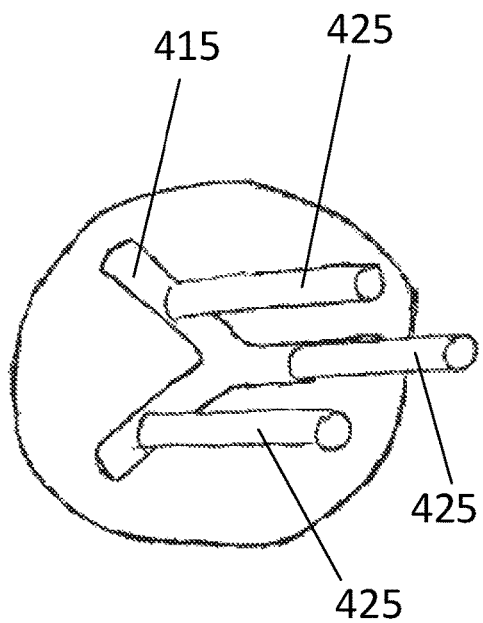
FIG. 16B depicts an embodiment of a trussing band joining apparatus jig.
Figure 16C:
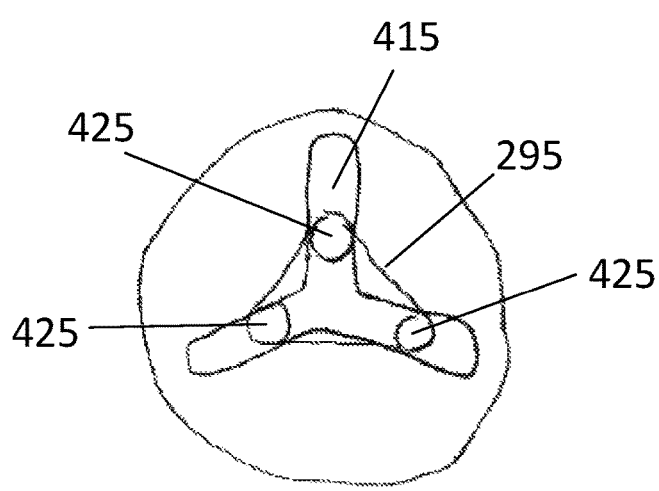
FIG. 16C depicts an embodiment of the trussing band joining apparatus jig of FIG. 16B in a one configuration.
Figure 16D:
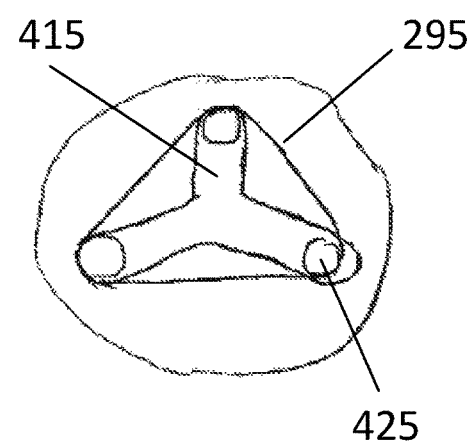
FIG. 16D depicts an embodiment of the trussing band joining apparatus jig of FIG. 16B in a further configuration.

In one embodiment the jig 415 may be adjustable and may be controllable by a controller to set the length. The jig may have two or more arms/fingers 425 and the arms/fingers may be adjustable. The adjustment of the arms/fingers 425 altering the length of a trussing band 295 that is required to go around the arms/fingers 425. FIG. 16C illustrates the jig 415 arms/fingers 425 in one position to create a trussing band 295 of a first length. FIG. 16D illustrates the jig 415 in a further position to create a trussing band 295 of a second length. As can be seen in the Figures the trussing band 295 of the second length is longer.

The join may in one embodiment be a knot, but any other join that is suitable may be used.

Figure 17:
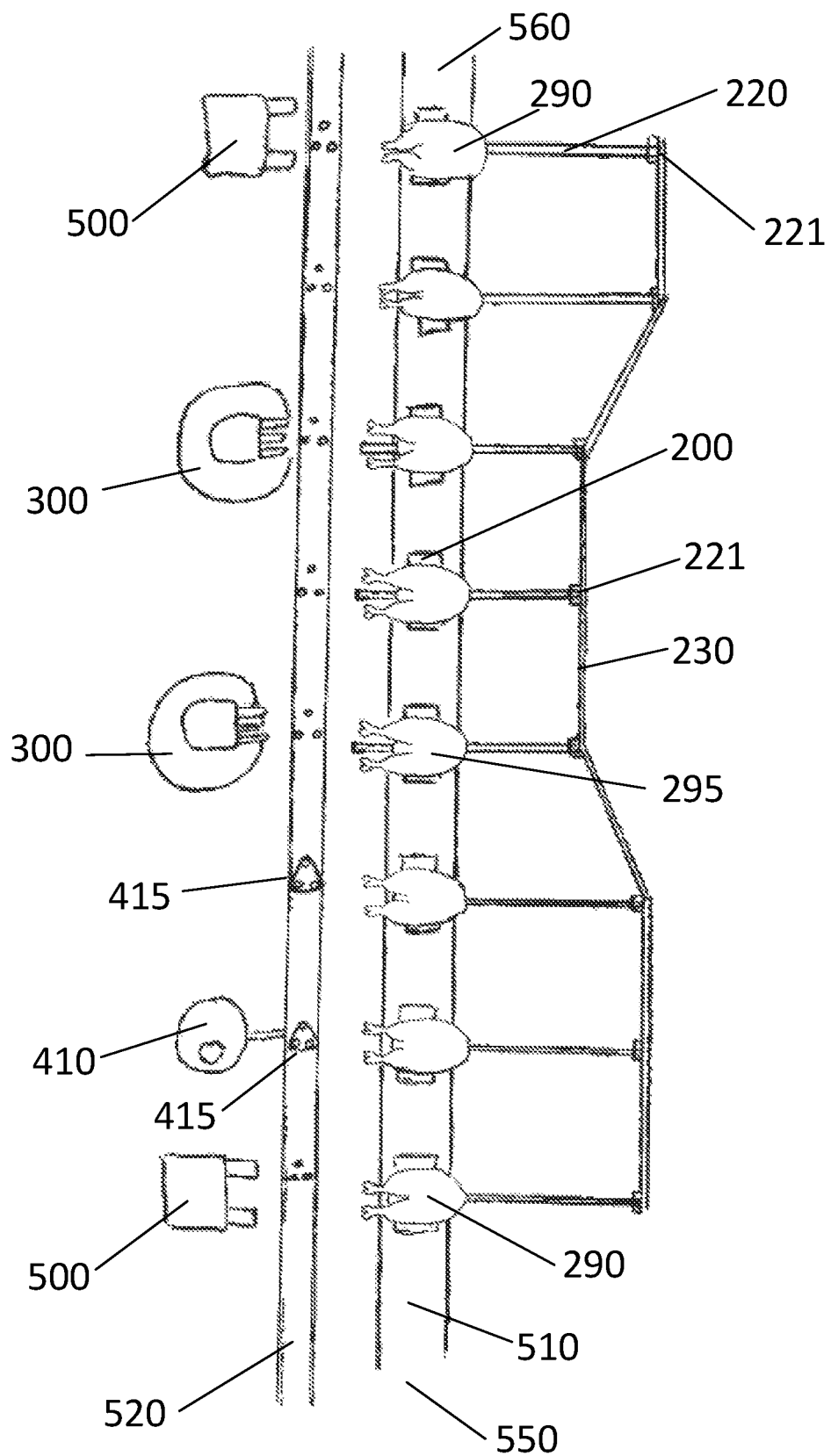
FIG. 17 depicts an embodiment of a trussing system.

FIG. 17 illustrates an example slaughtered bird trussing system. The system includes a vision system 500, incorporating at least one image capture device for capturing at least one image of a slaughtered bird 290. In the example illustrated multiple vision systems 500 are used so that the visions system 500 can capture images before a slaughtered bird 290 is trussed and after a slaughtered bird 290 is trussed. The first image system 500 positioned on the trussing line before 550 the slaughtered birds are trussed and a second image system 500 is located on the trussing line after 560 the slaughtered birds are trussed.

In one embodiment the imaging systems may be associated with a trussing device 410 such that the image system 410 may be used to assist the trussing device 410 by providing information to allow a controller either of the trussing device 410 or of the system 600 to control the trussing device during trussing.

The image capture devices of the imagine system 500 may in one embodiment generates a two-dimensional image of a slaughtered bird. In a further embodiment the image capture device may additionally or alternatively generate a three-dimensional image of a slaughtered bird. The image capture devices that could be used include one or more standard 2D cameras, a time-of-flight camera, a CCD or an image sensor.

The controller either of the trussing device 410 or of the system 600 includes a determination system. The determination system uses the images to assist in reaching determination and providing information based on one or more images.

The determination the system is able to make include the quality of a slaughtered bird, the size of a slaughtered bird, the shape of a slaughtered bird, the position of a slaughtered bird in a holder. In determining quality assessments that are made include if a wing is in a correct position before or after trussing, if a wing and/or leg of the slaughtered bird is broken or missing, the skin condition of the slaughtered bird the quality of a truss on a slaughtered bird including whether a trussing band is in a correct position.

The determination system based on the images or received information is able to calculate the required length a trussing band based on at least a shape of a slaughtered bird, the trussing method to be used the size of the slaughter bird. The received information received from other systems may include the weight of a slaughtered bird the type of truss to be applied to a slaughtered bird or the size of a slaughtered bird if for example all the slaughtered birds to be trussed are pre-sized. The types of truss may include wings and legs/hocks or hocks only.

The controller either of the trussing device 410 or of the system 600 may communicate the length of the required truss 295 to a truss tying apparatus 400. The truss tying apparatus 400 may be controlled by the controller of the trussing device 410, system controller 600 or a separate controller. In response to receiving information of the length of the required truss 295 the truss tying apparatus 400 makes the truss 295 and may in one embodiment please it on a jig 415 or cassette of a conveyer 520

The trussing apparatus 300 for trussing a slaughtered bird may in one embodiment be controlled by the vision system 500 or in a further embodiment controlled using information retrieved from the vision system 500. The trussing apparatus 300 may be a robot and the motion of the robot may be controlled based on information from the vision system 500.

Based on the information from the vision system a robot may holds a slaughtered bird 290 and truss the slaughtered bird 290 by moving the slaughtered bird 290 relative to a fixed trussing band. Further based on the information from the vision system a robot may move a trussing band 295 over a slaughtered bird 290.

The vision system 500 allows for various alternatives to be implemented from accessing the quality of a bird through to use of images to control the trussing process. The implemented system will of course depend on the application.

A method of trussing a slaughtered bird 290 with a trussing band 295 in one example embodiment will be discussed with particular reference to FIGS. 18A to 18R.

Figure 18A:
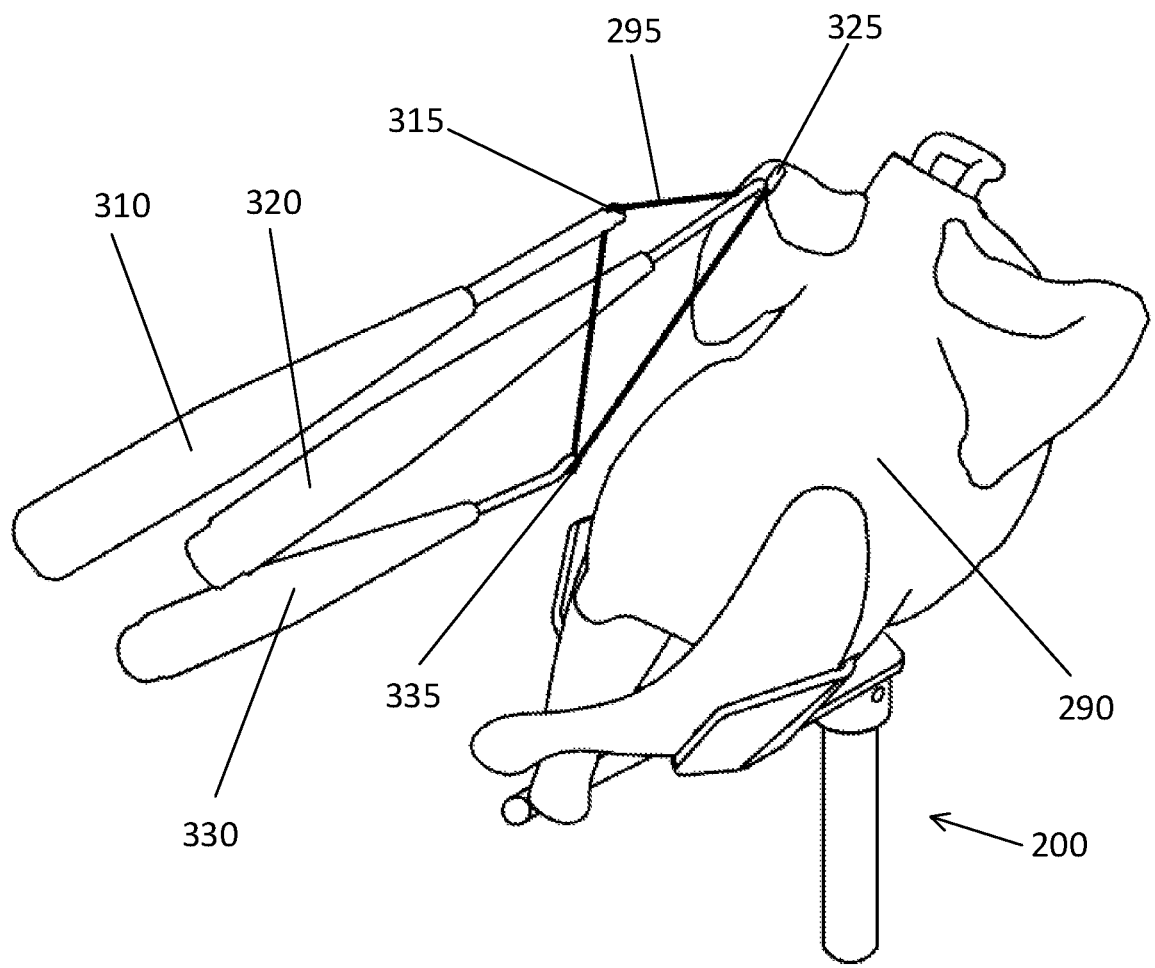
FIGS. 18A to R depicts a slaughtered bird trussing operation.

FIG. 18A illustrates the trussing apparatus members 310, 320, 330 with a trussing band 295. The slaughtered bird 290 is positioned in a slaughtered bird holder 200 with the front of the slaughtered bird 290 facing outwards.

Figure 18B:
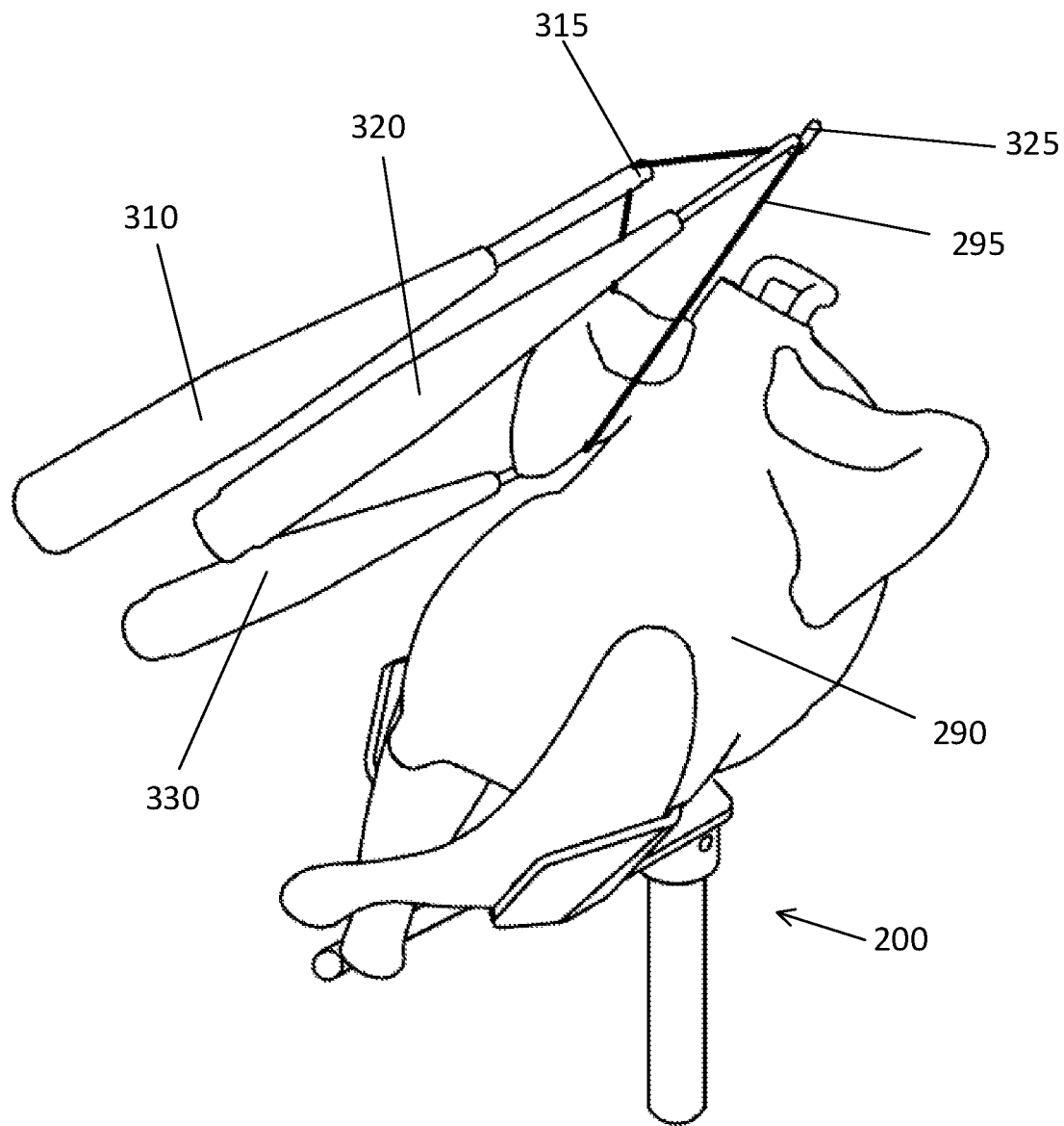
Figure 18C:
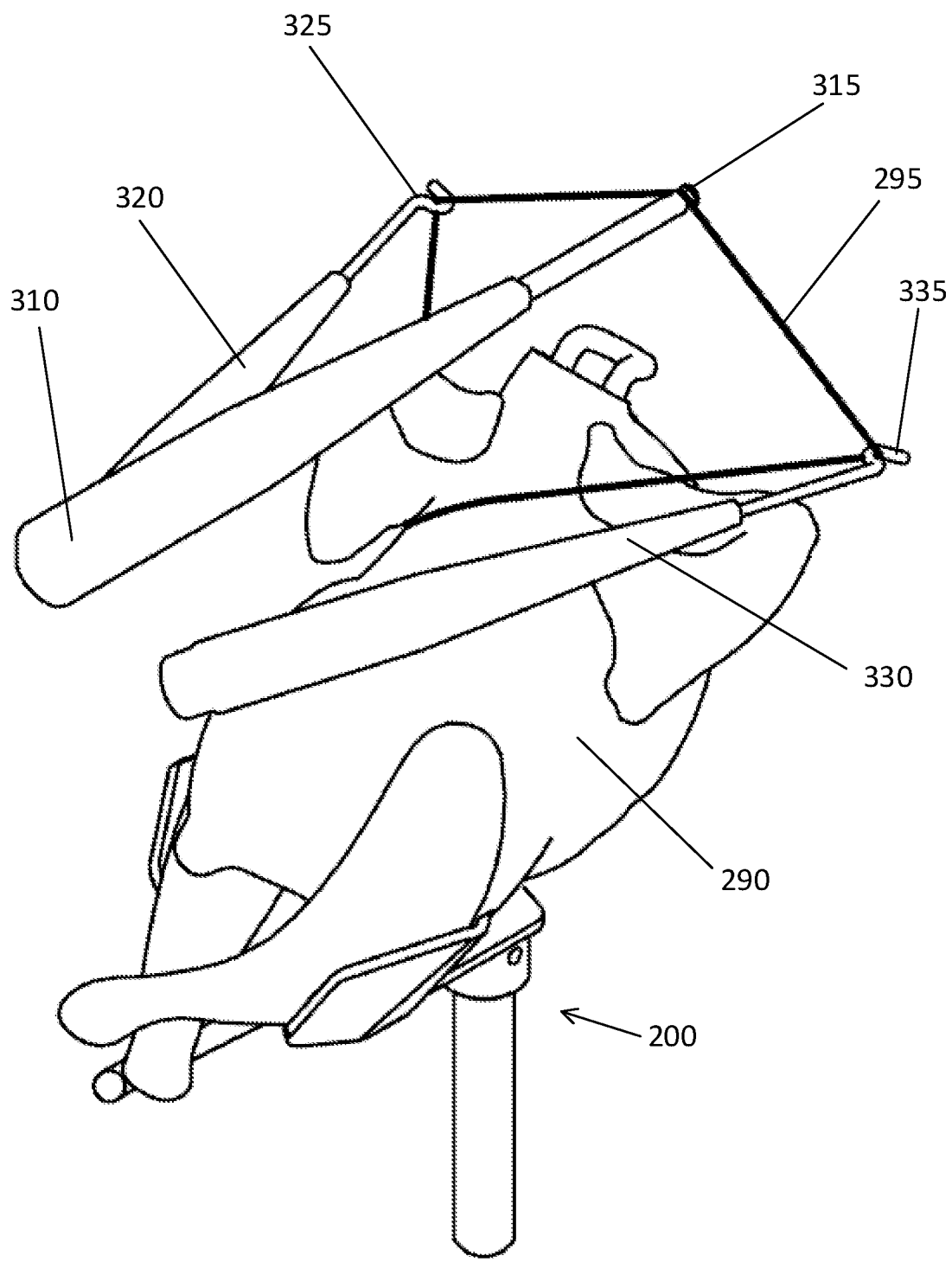
Figure 18D:
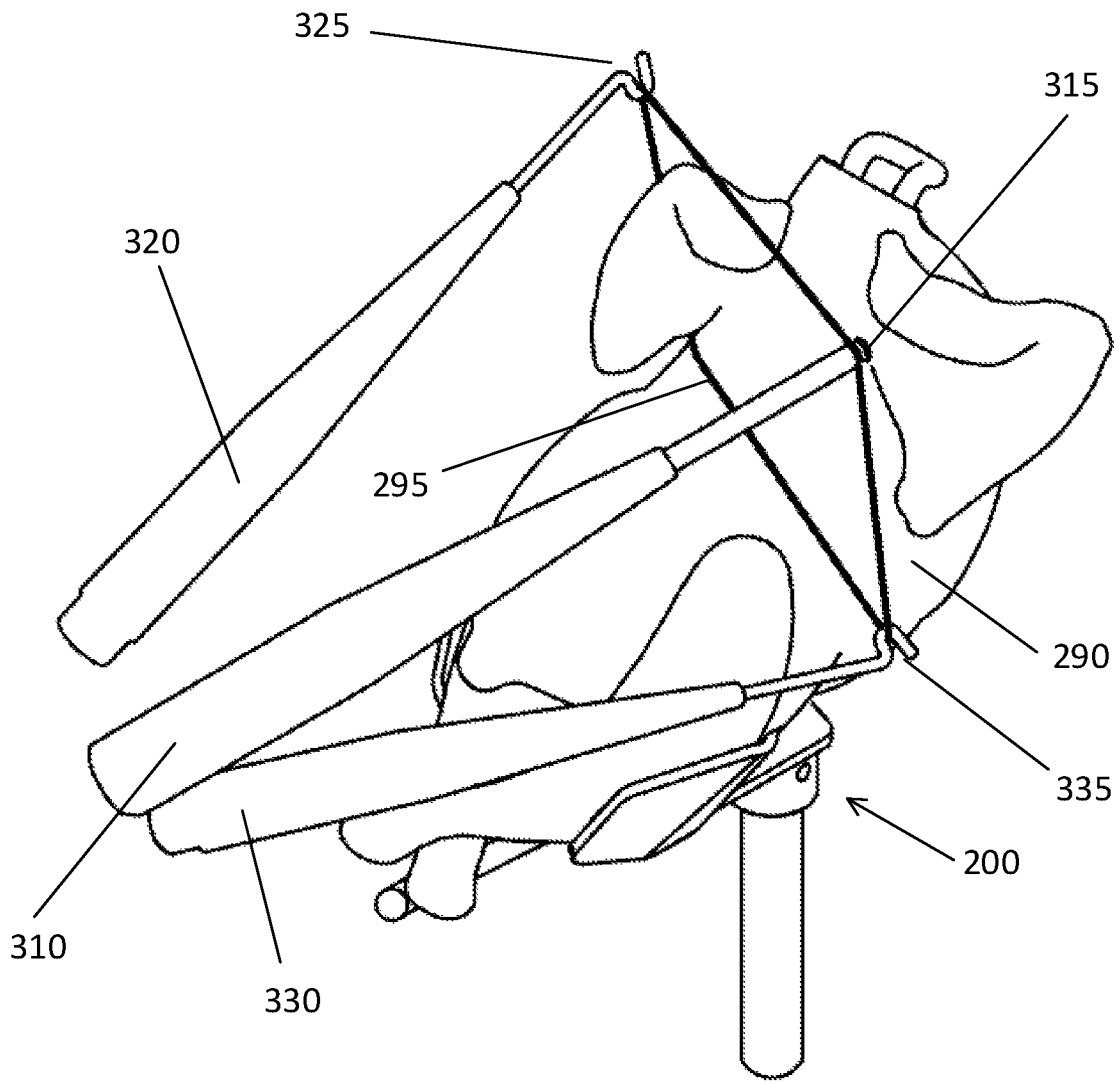
Figure 18E:
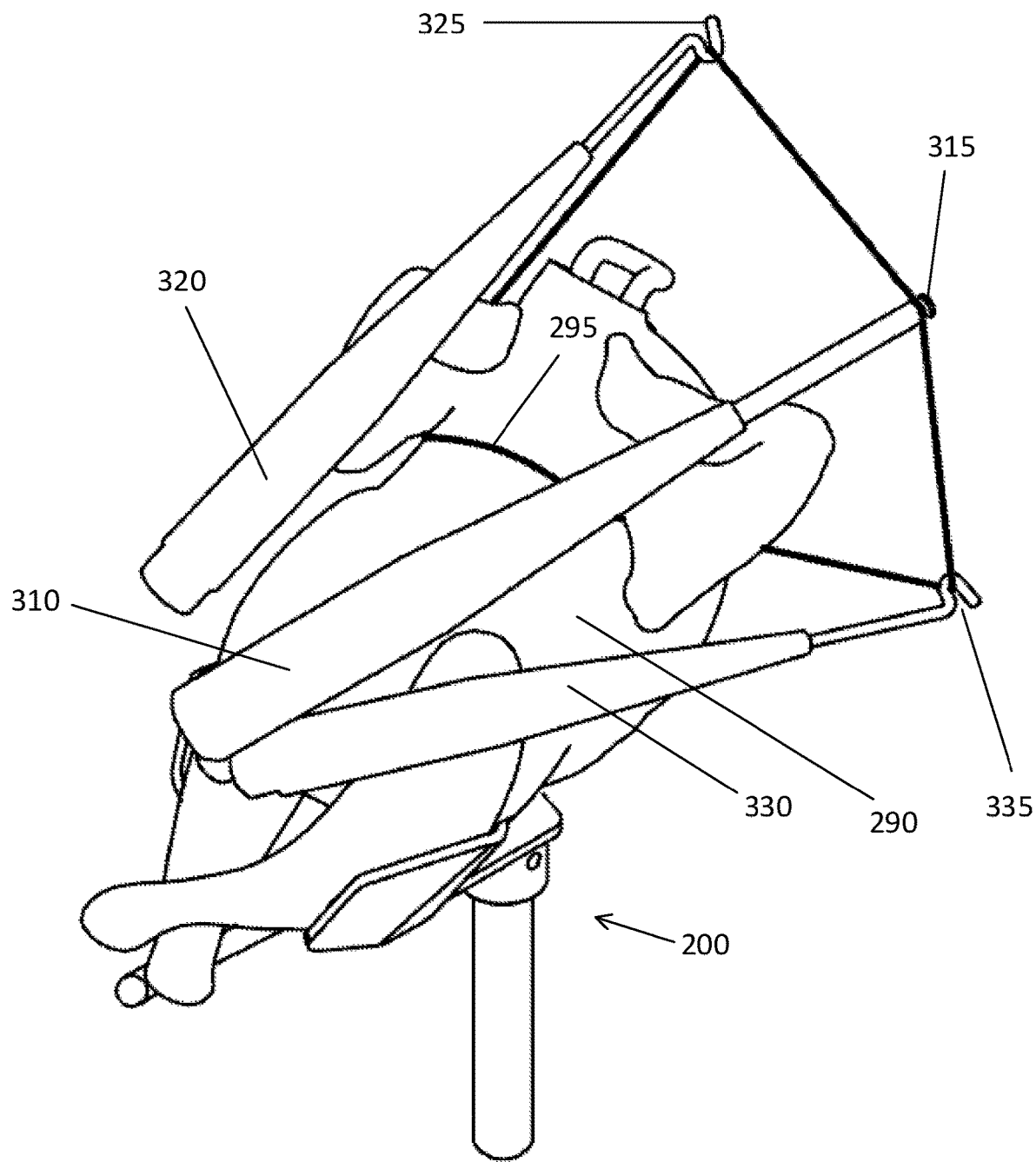
Figure 18F:
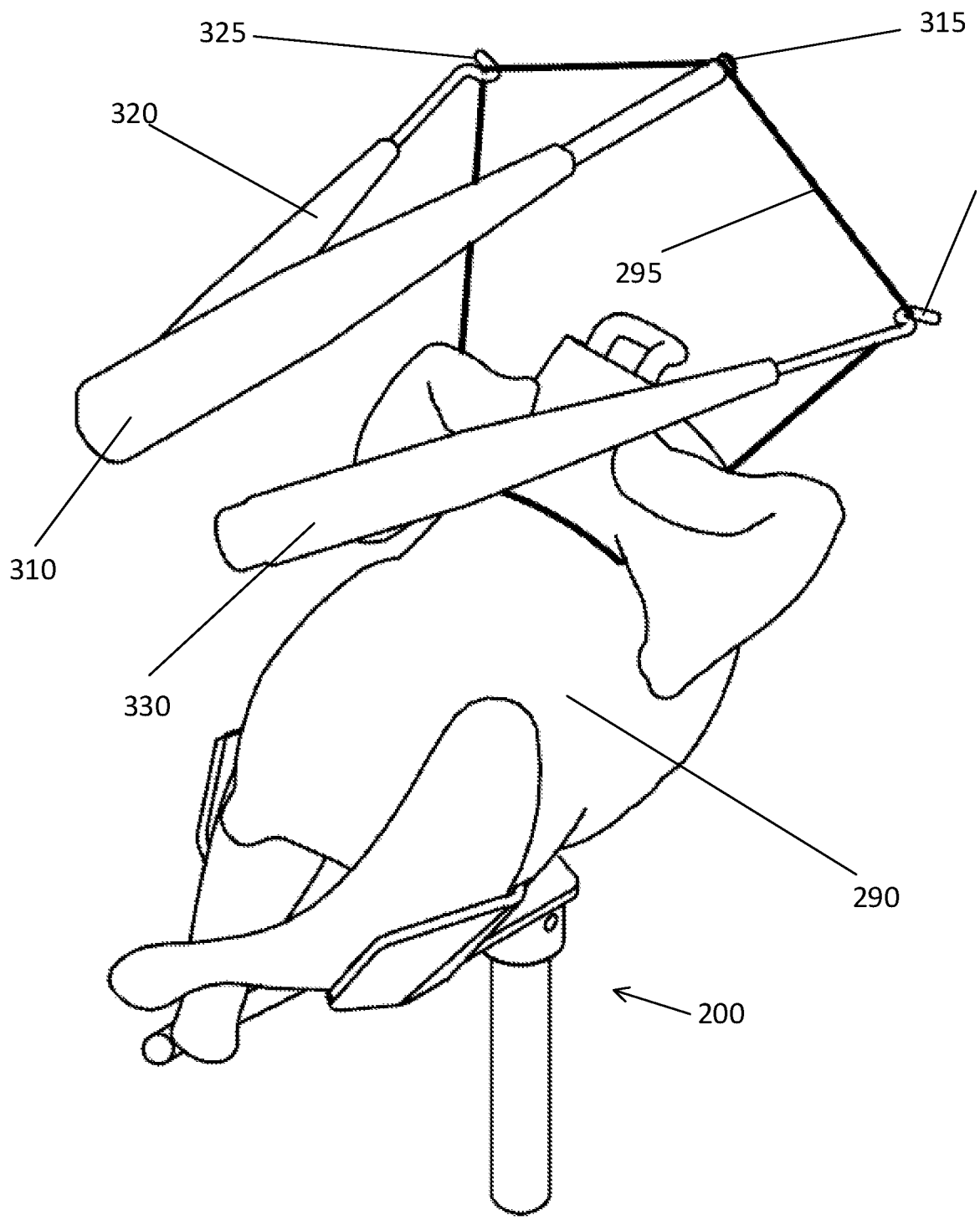
Figure 18G:
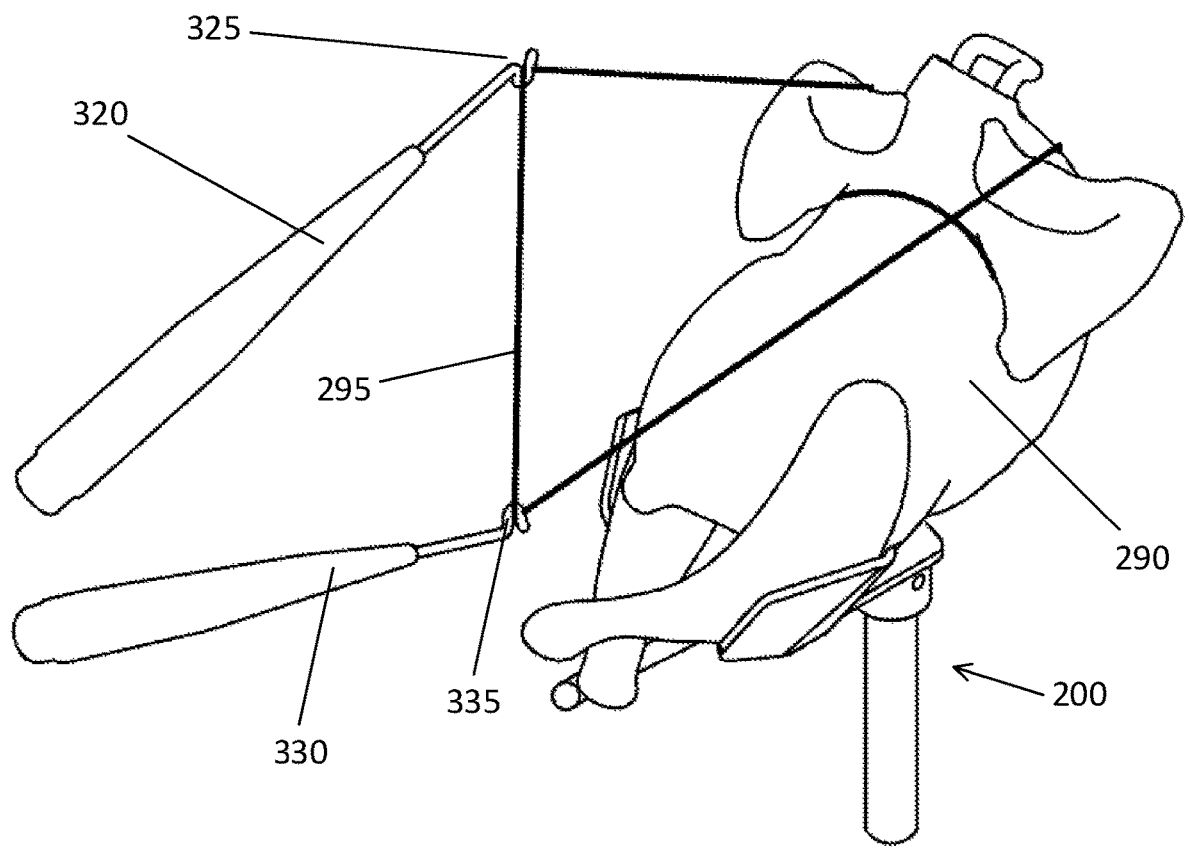
Figure 18H:
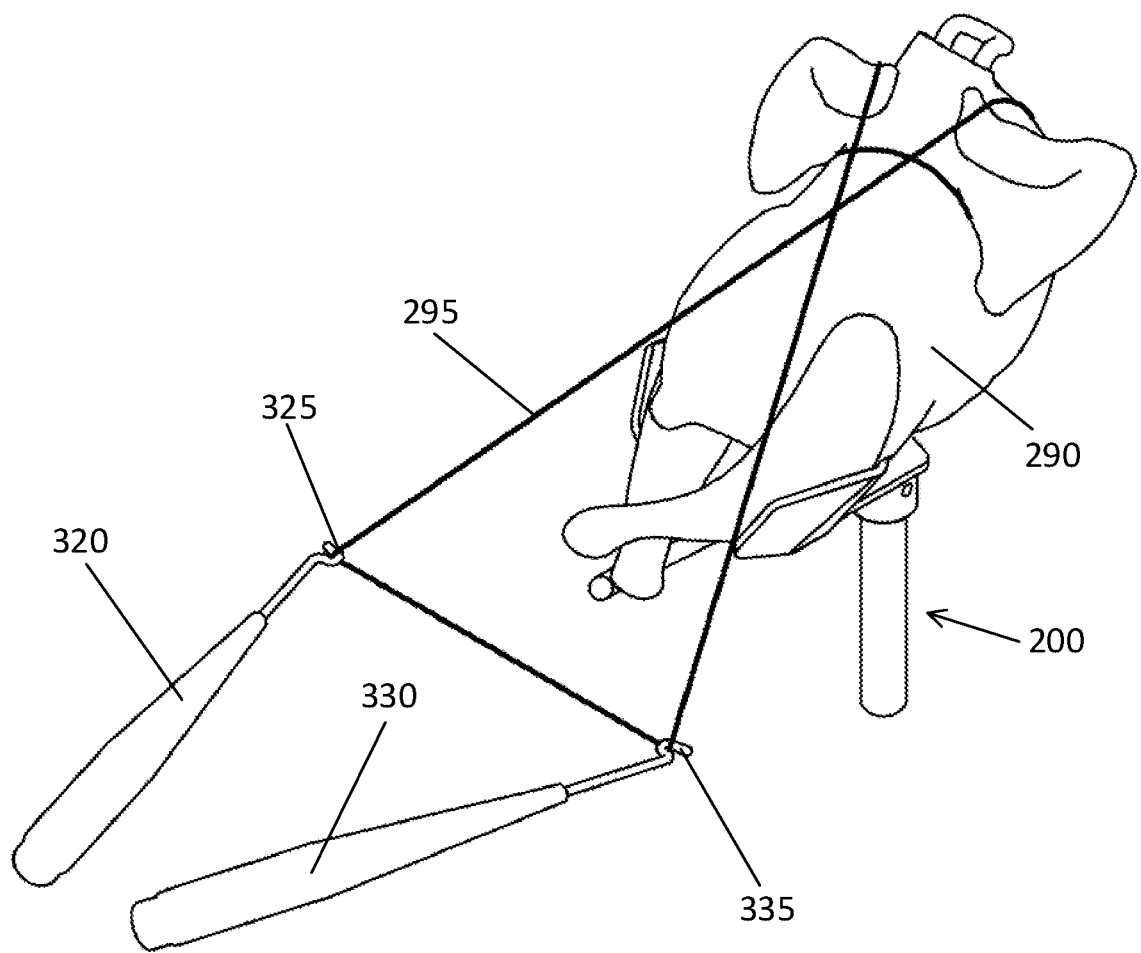

In FIG. 18B the trussing band 295 is passed over a front of the slaughtered bird 290 then as illustrated in FIG. 18F passed under a first and second wing of the slaughtered bird 290 while maintaining tension on the trussing band 295. The trussing band 295 is then as seen in FIG. 18F passed over the back of the slaughtered bird 290 and twisted over the back of the slaughtered bird to create a cross-over point in the trussing band (FIG. 18H).

Figure 18I:
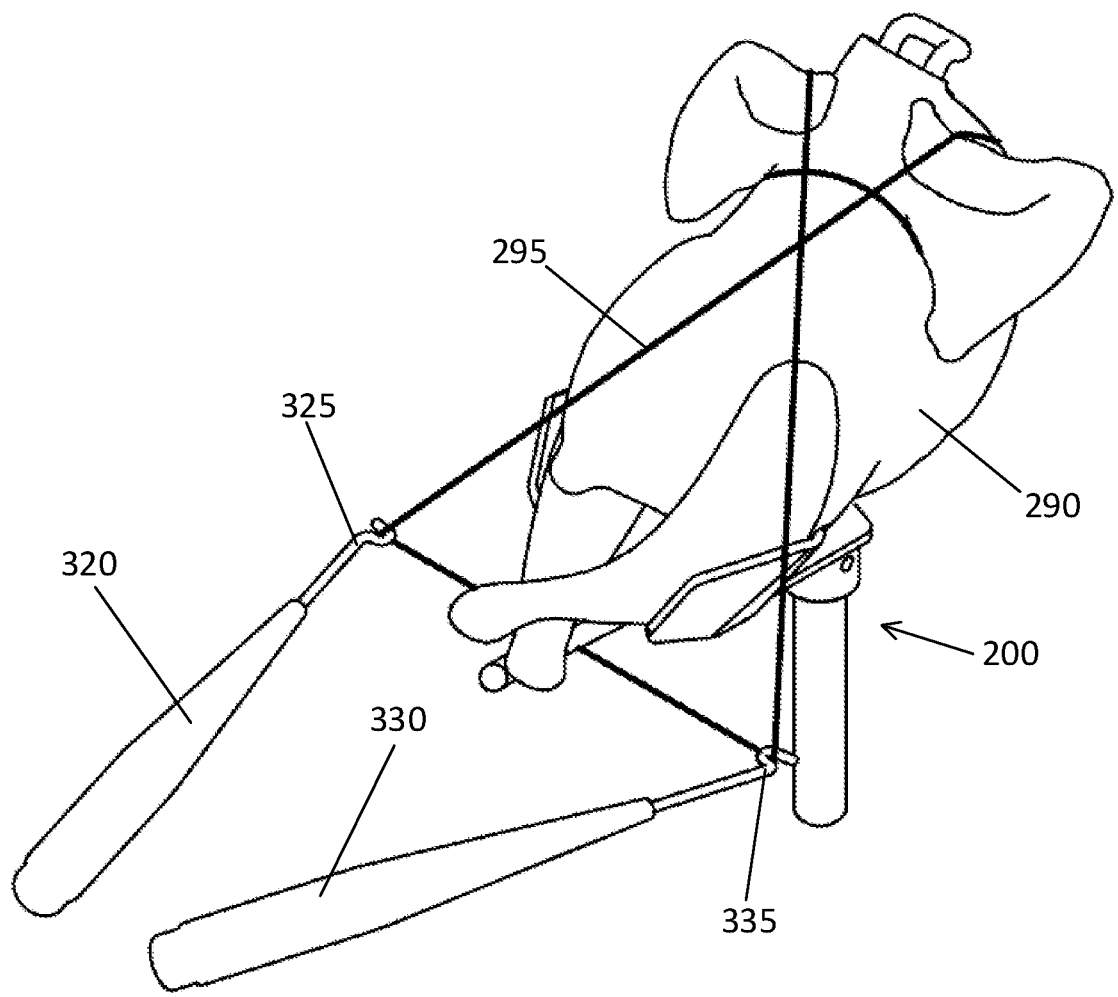
Figure 18J:
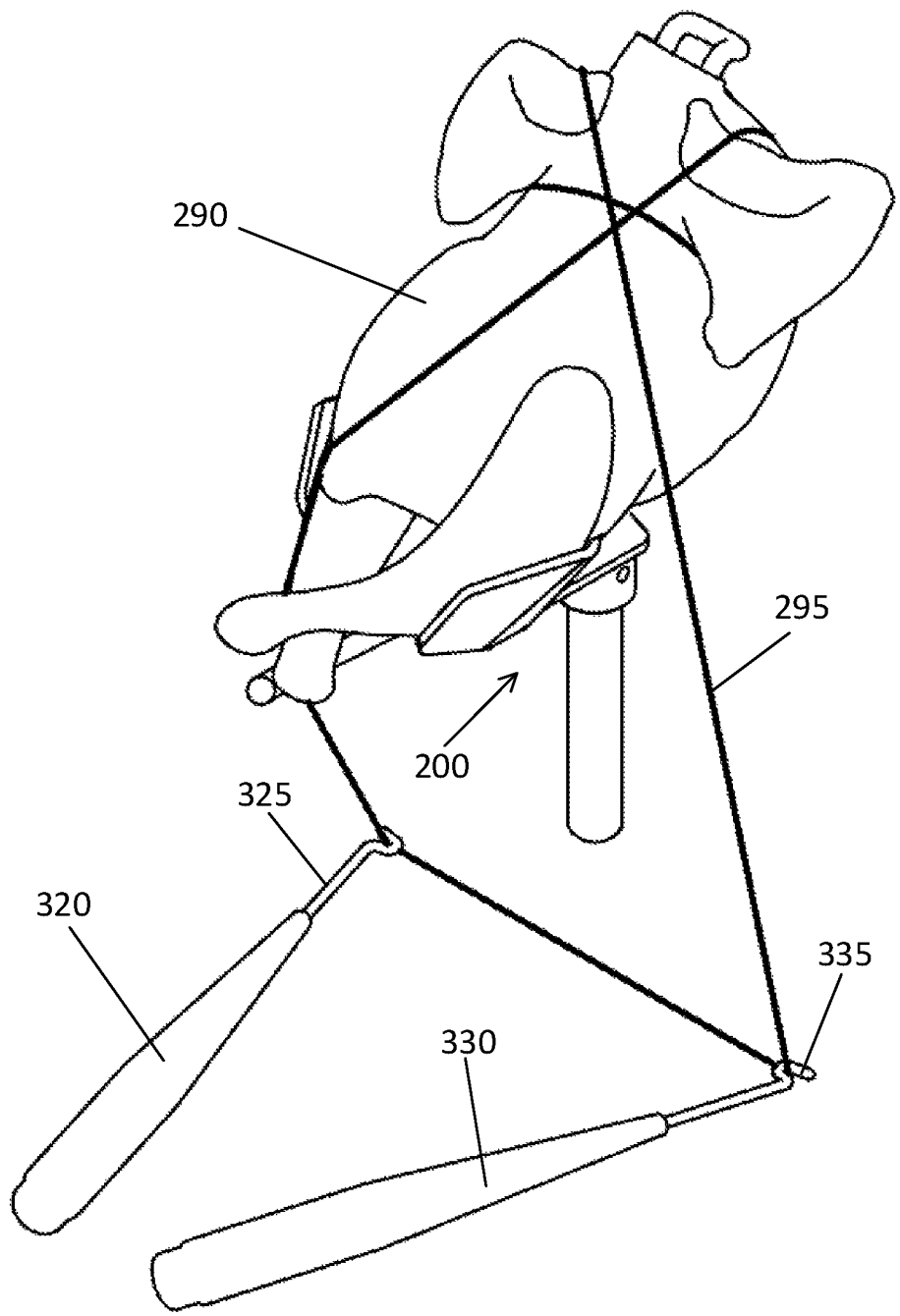
Figure 18K:
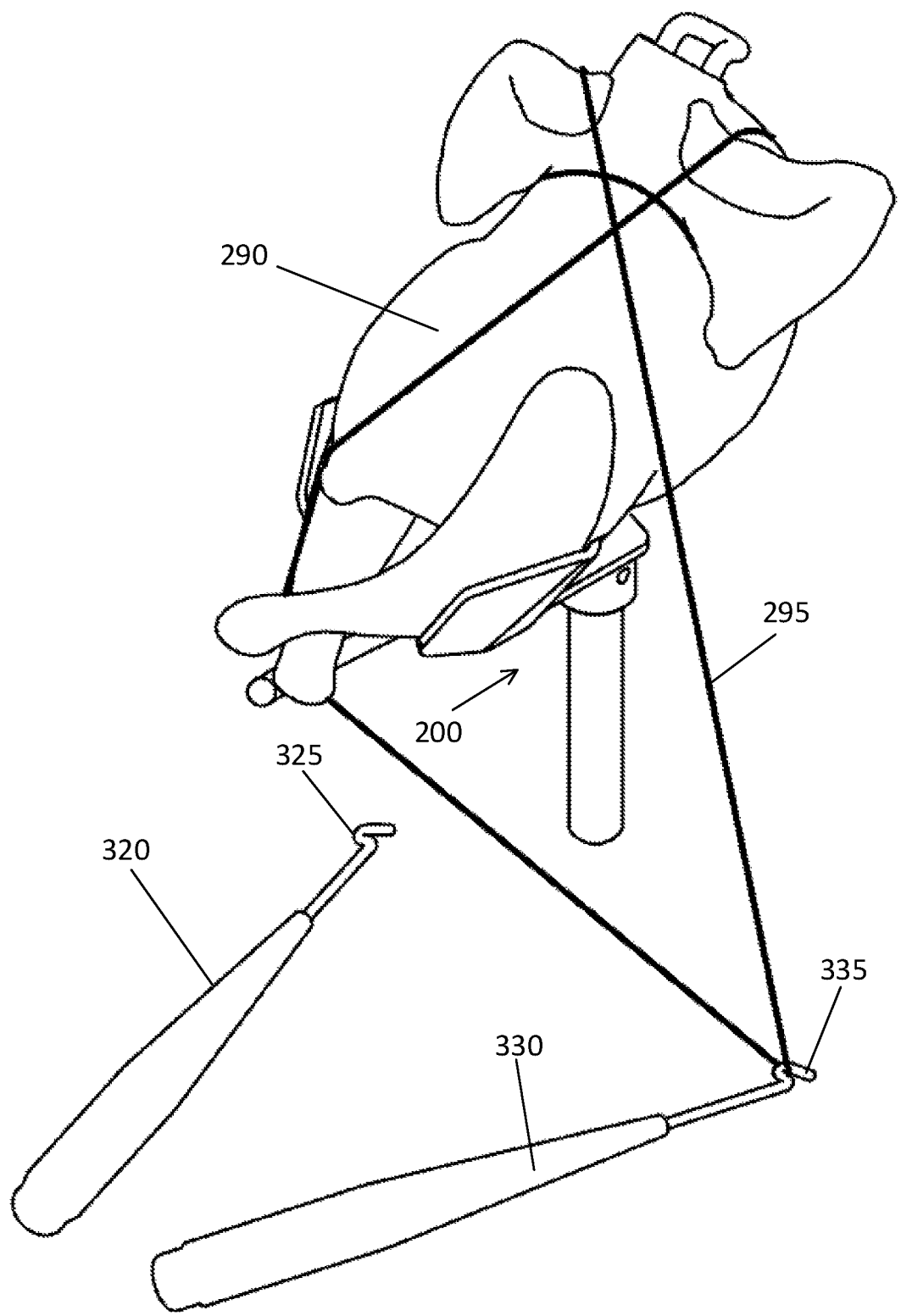
Figure 18L:
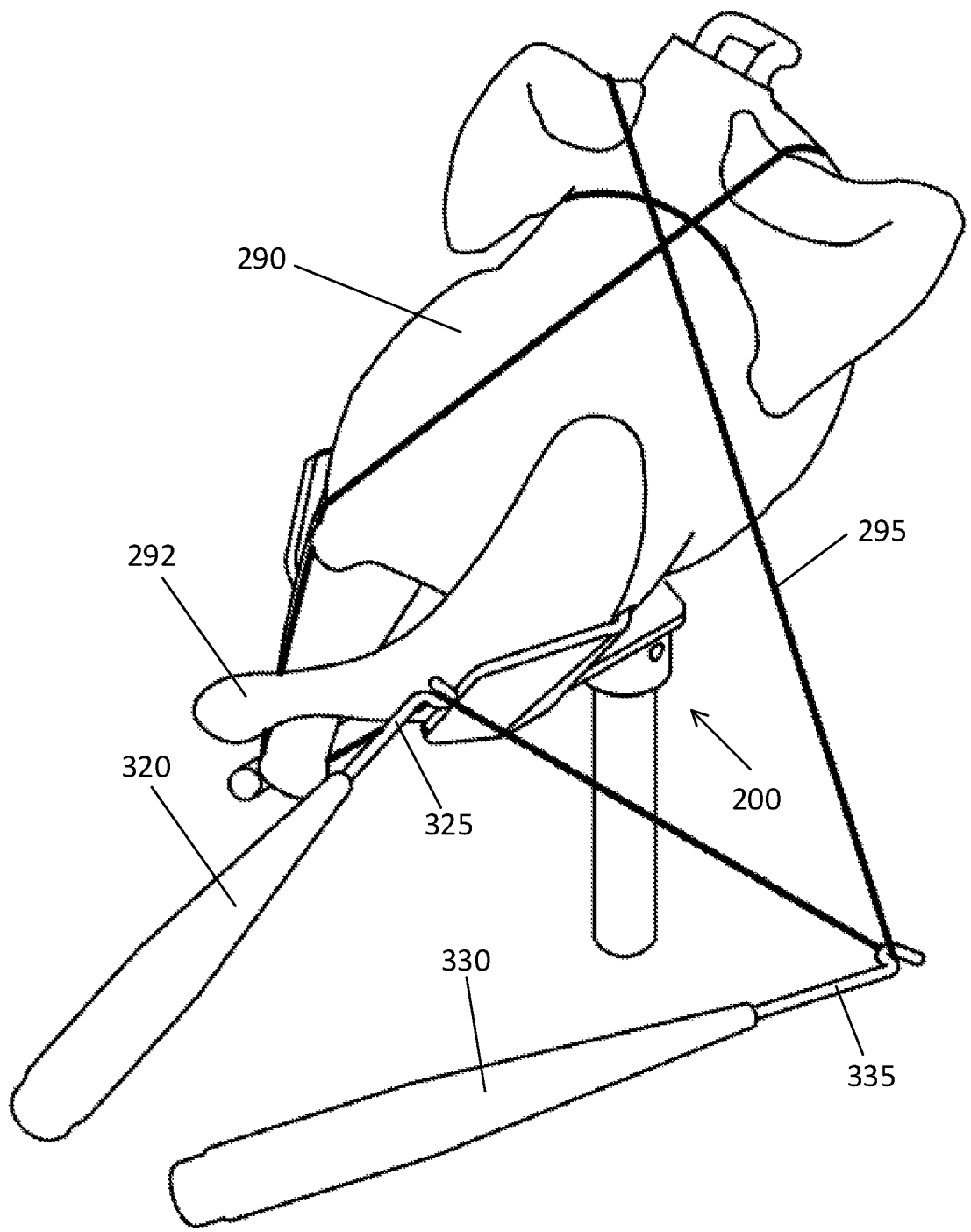
Figure 18M:
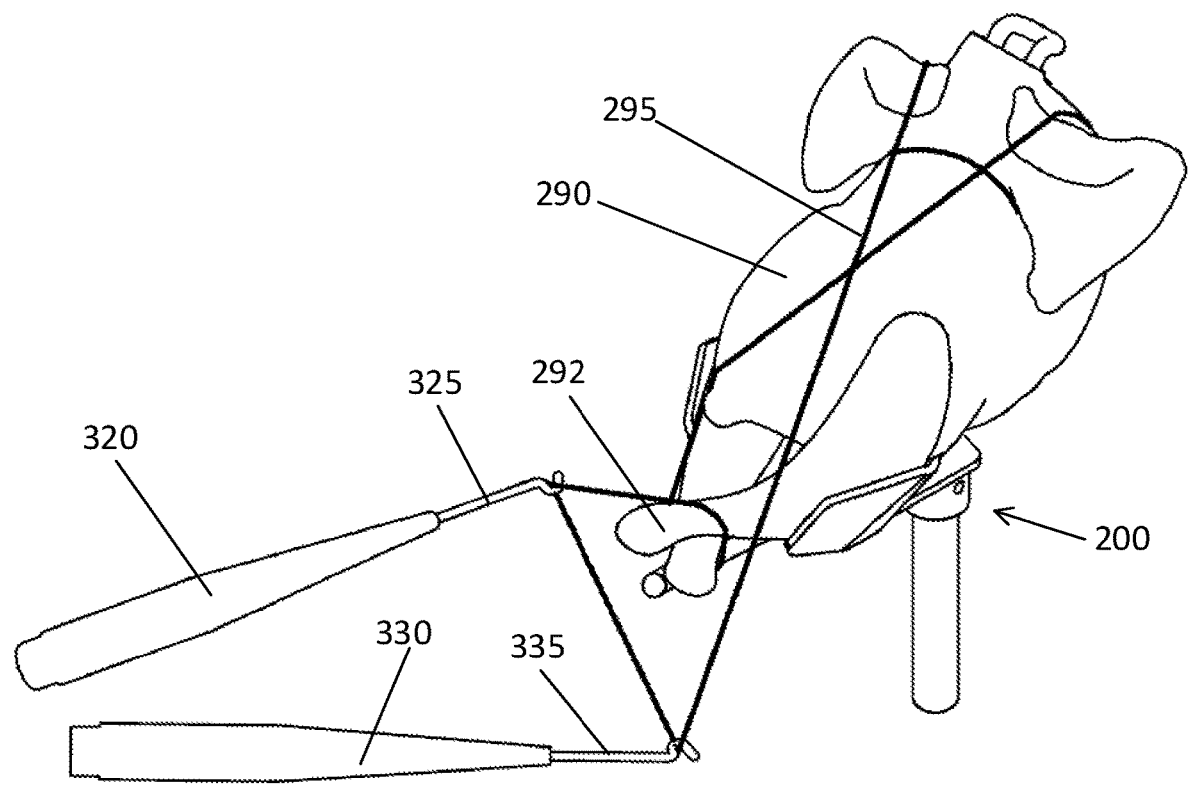
Figure 18N:
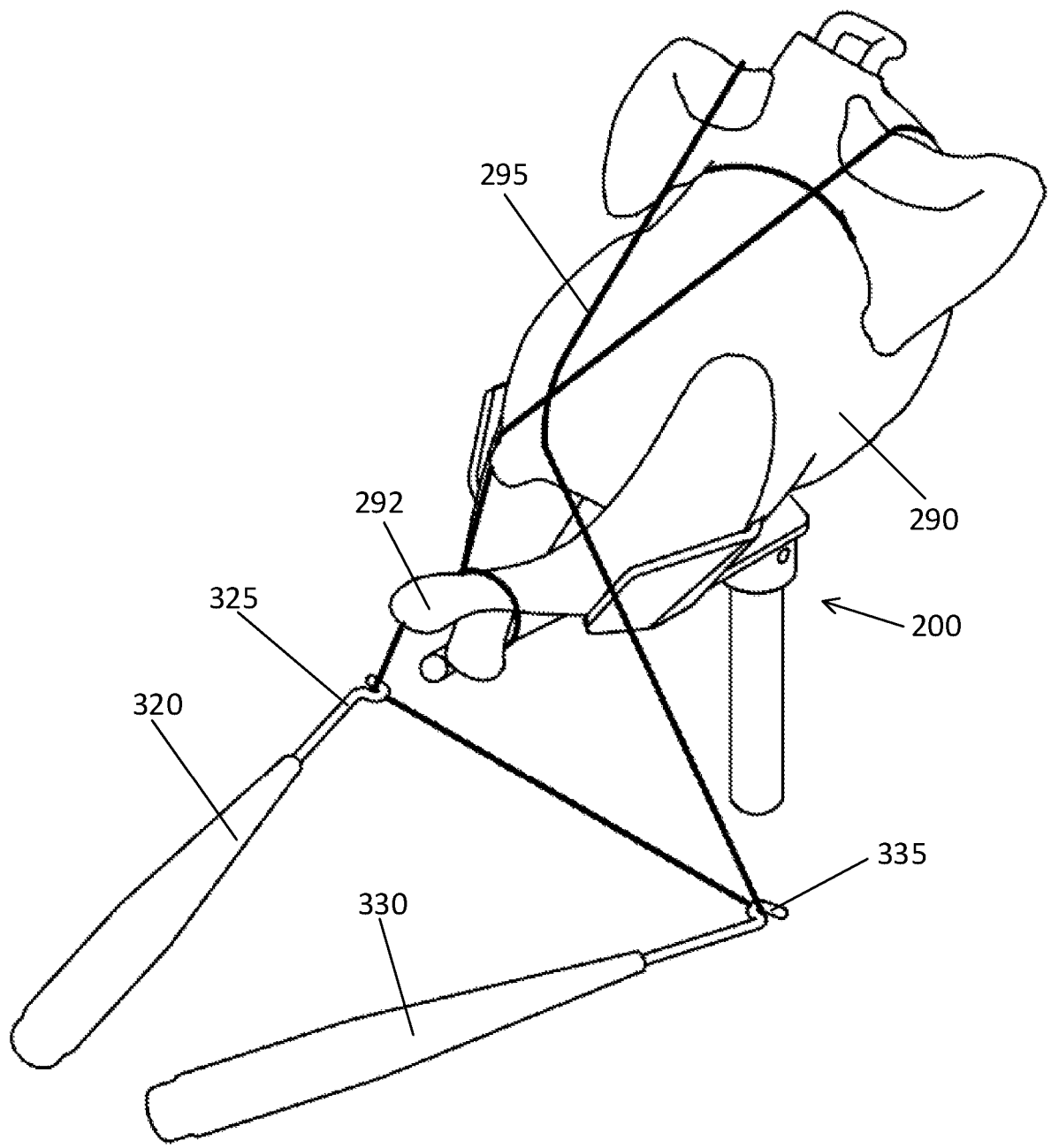
Figure 18O:
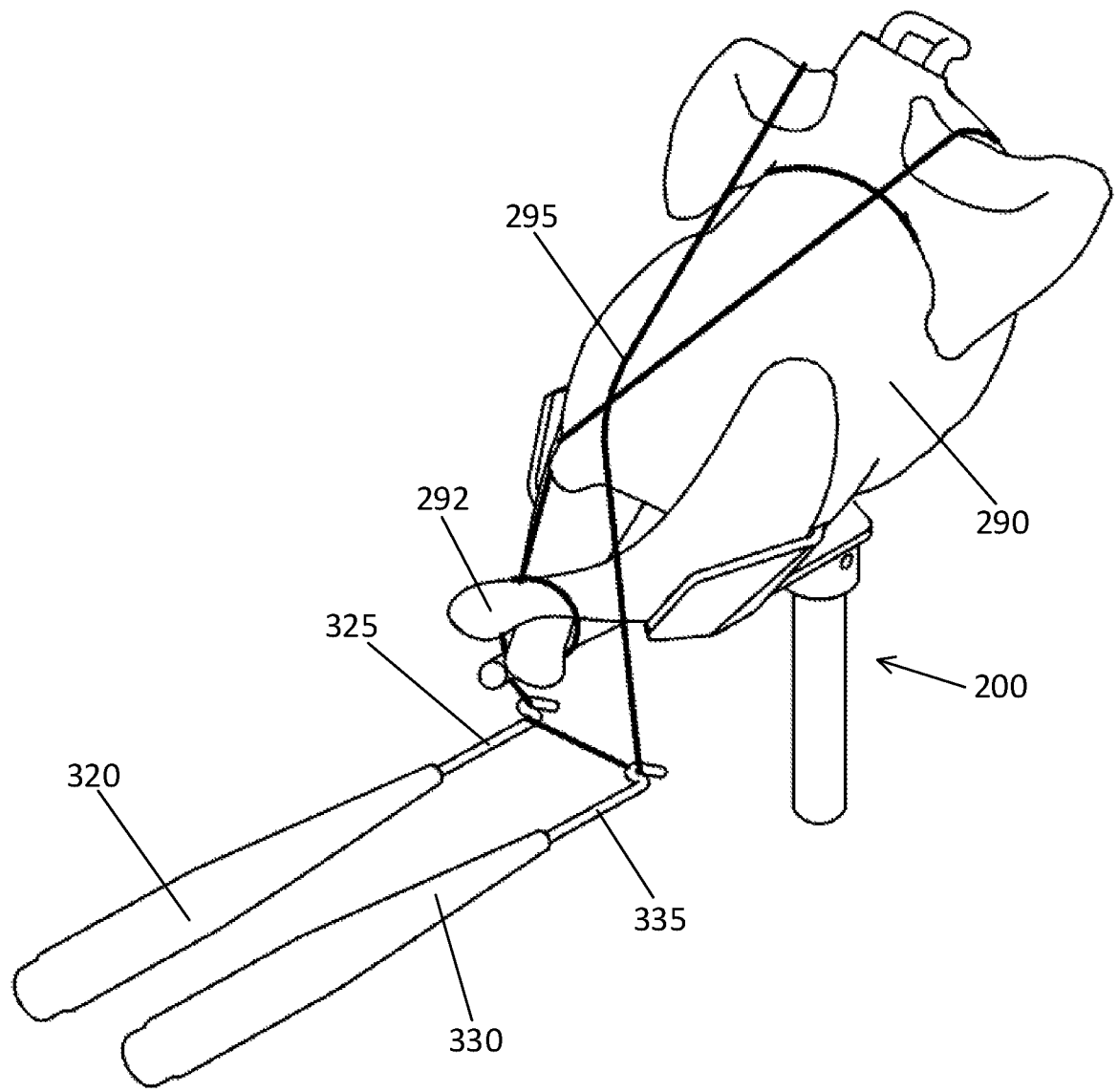
Figure 18P:
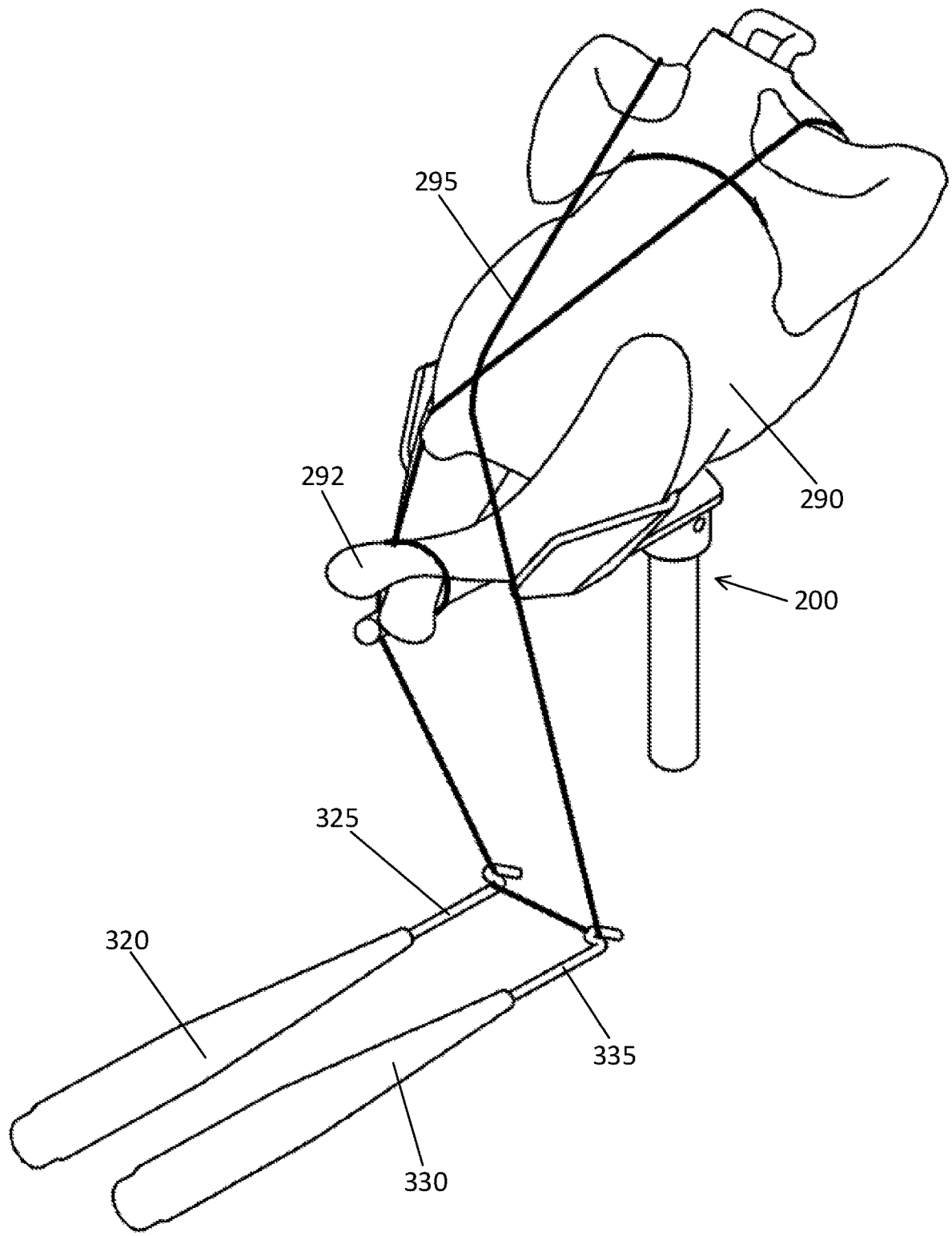
Figure 18Q:
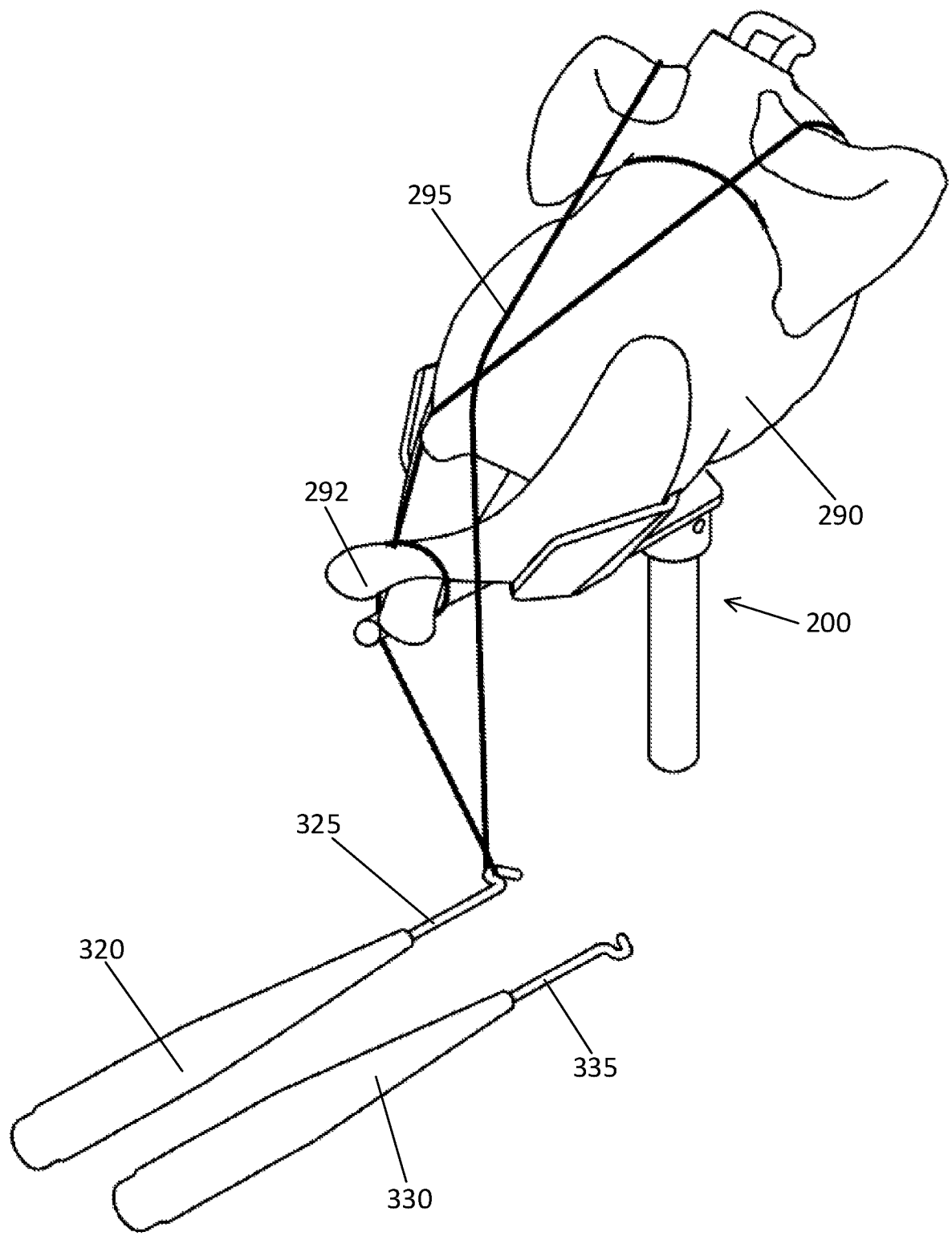
Figure 18R:
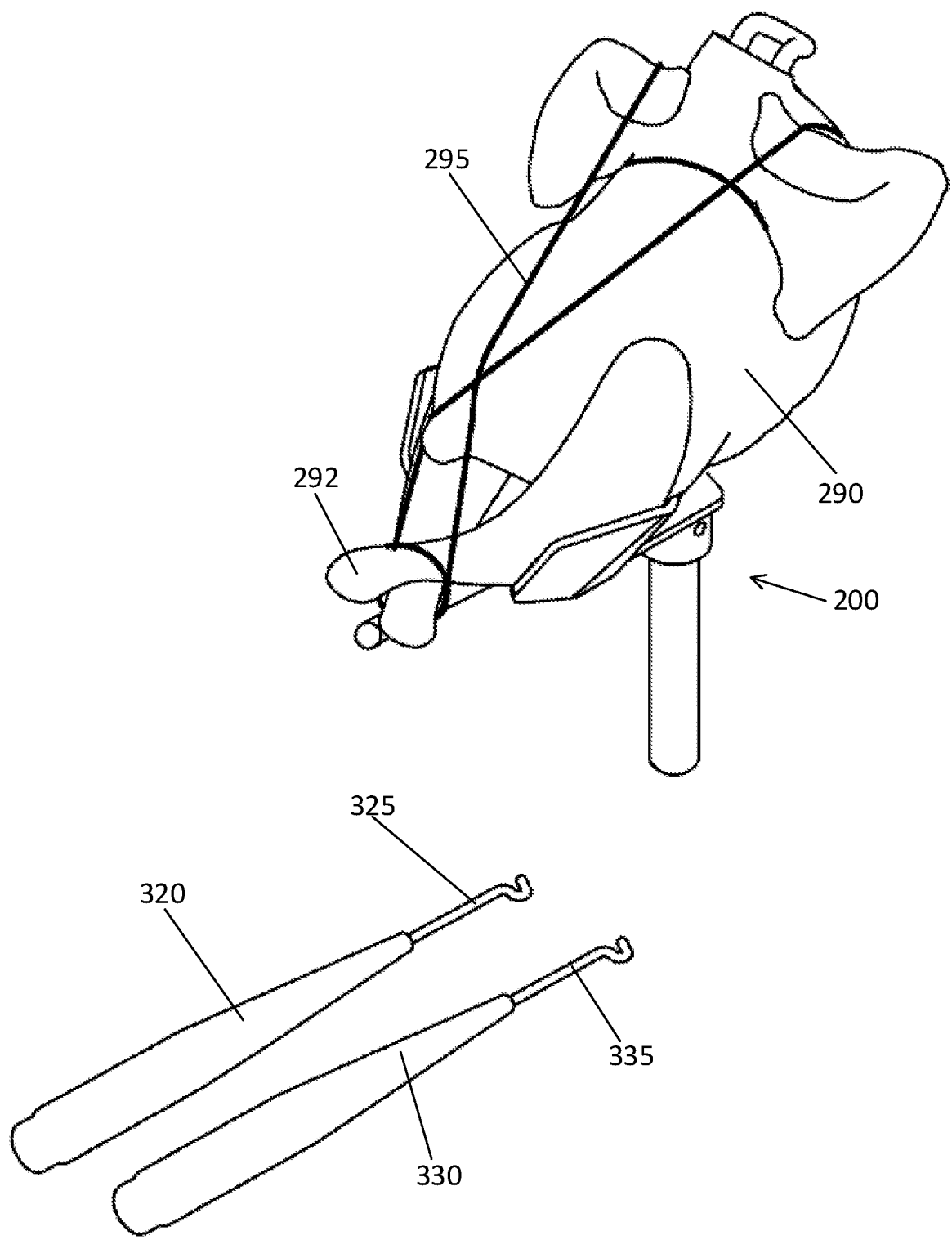

The trussing band is the pulled underneath a first and second hock of the slaughtered bird (FIG. 18I). As the member 320 is on top of the trussing band 295 in order to pass the trussing band 295 over the first and second hock of the slaughtered bird the hook 325 of the member 320 must first be disconnected (FIG. 18K) and then must locate the trussing band 295 as seen in FIG. 18L to then pass the trussing band 295 underneath a first and second hocks of the slaughtered bird 290 (FIG. 18M).

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An apparatus for trussing a slaughtered bird, the apparatus including:
    two or more members having trussing band retaining members,
    wherein the apparatus is configured to truss a slaughtered bird with a trussing band, and
    wherein the apparatus is an end effector of a robot.

2. The apparatus of claim 1 wherein at least one of the two or more members includes a load cell configured to determine the tension of a retained trussing band.

3. The apparatus of claim 1 wherein at least two of the two or more members for at least part of a length of the member have a first transverse axis larger than a second transverse axis at the same location on the member.

4. The apparatus of claim 3 wherein two of the at least two of the two or more members are configured to move from a first position in which the first axis of a first of the two members is collinear to the first axis of a second of the two members to a second position in which the first axis of the two members is parallel and wherein in the second position in which a trussing band located on the length of the members having a first transverse axis larger than a second transverse axis at the same location spreads the trussing band.

5. The apparatus of claim 4 wherein the shape of the length of the members having a first transverse axis larger than a second transverse axis at the same location is selected from the group consisting of rectangular, oval and obround.

6. A method of trussing a slaughtered bird with a trussing band, the method including:
    positioning a slaughtered bird in a holder with the front of the slaughtered bird facing outwards;
    controlling a trussing apparatus to:
        pass the trussing band over a front of the slaughtered bird,
        pass the trussing band under a first and second wing of the slaughtered bird while maintaining tension on the trussing band;
        bring the trussing band over a back of the slaughtered bird;

twist the trussing band over the back of the slaughtered bird to create a cross-over point in the trussing band;

pass the trussing band underneath a first and second hock of the slaughtered bird;

pass the trussing band over the first and second hock of the slaughtered bird; and pass the trussing band underneath a first and second hock of the slaughtered bird.

7. The method of claim 6 further including retaining a portion of the trussing band against a movable rod using a tension of the trussing band.

8. The method of claim 7 wherein retaining a second portion of the trussing band against the first and second hock further includes: wrapping a third portion of the trussing band around the first hock, and wrapping a fourth portion of the trussing band around the second hock, such that the first and second hocks are biased against one another using a tension of the trussing band.

9. A slaughtered bird trussed according to the method of claim 6.

* * * * *